US007010166B2

(12) United States Patent
Ayshi et al.

(10) Patent No.: US 7,010,166 B2
(45) Date of Patent: Mar. 7, 2006

(54) CHARACTER RECOGNITION SYSTEM AND METHOD USING SPATIAL AND STRUCTURAL FEATURE EXTRACTION

(75) Inventors: Mohammed Abu Ayshi, Endicott, NY (US); M. Jay Kimmel, Endicott, NY (US); Diane C. Simmons, Cortland, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 640 days.

(21) Appl. No.: 09/991,553

(22) Filed: Nov. 21, 2001

(65) Prior Publication Data

US 2002/0085758 A1    Jul. 4, 2002

Related U.S. Application Data

(60) Provisional application No. 60/252,817, filed on Nov. 22, 2000.

(51) Int. Cl.
G06K 9/48 (2006.01)

(52) U.S. Cl. ....................... 382/199; 382/190

(58) Field of Classification Search ............... 382/159, 382/177–178, 181, 183, 185–187, 190, 195, 382/197, 199, 202, 204, 209, 218, 224, 229
See application file for complete search history.

(56) References Cited

U.S. PATENT DOCUMENTS

| | | | | |
|---|---|---|---|---|
| 3,930,231 A | * | 12/1975 | Henrichon et al. | 382/207 |
| 4,545,067 A | | 10/1985 | Juvin et al. | 382/153 |
| 4,628,532 A | * | 12/1986 | Stone et al. | 382/197 |
| 4,700,400 A | * | 10/1987 | Ross | 382/205 |
| 4,757,551 A | | 7/1988 | Kobayashi et al. | 382/170 |
| 4,912,559 A | | 3/1990 | Ariyoshi et al. | 382/225 |
| 5,105,470 A | | 4/1992 | Will | 382/186 |
| 5,335,290 A | | 8/1994 | Cullen et al. | 382/176 |
| 5,583,949 A | * | 12/1996 | Smith et al. | 382/199 |
| 5,703,963 A | | 12/1997 | Kojima et al. | 382/197 |
| 5,734,750 A | | 3/1998 | Arai et al. | 382/202 |

(Continued)

OTHER PUBLICATIONS

Hung-Pin Chiu, A novel stroke-based feature extraction for handwritten Chinese character recognition, Pattern Recognition, Aug. 18, 1999, Issue 32, pp. 1947-1959, Elsevier Science Ltd.,.

*Primary Examiner*—Daniel Miriam
(74) *Attorney, Agent, or Firm*—Louis J. Franco; Leland D. Schultz; Patrick M. Hogan

(57) ABSTRACT

A character recognition system and method implement a classification system according to which each character of a set of characters is identifiable at least partially on the basis of a set of character feature types indicative of the identity of the character, the set of character feature types including (i) bars; (ii) lakes and (iii) bays. A character image is algorithmically scanned in each direction of a predetermined set of scan directions in order to extract data relating to bars, lakes and/or bays. A feature vector is assembled based on the algorithmically extracted data and rendered accessible to character recognition apparatus. The character recognition apparatus is adapted to recognize a character corresponding to an assembled feature vector at least partially on the basis of the quantity of each of (i) bars; (ii) lakes and (iii) bays indicated in the feature vector and to provide an output identifying the recognized character.

12 Claims, 25 Drawing Sheets

Illustrative Character Recognition System

U.S. PATENT DOCUMENTS

| | | | |
|---|---|---|---|
| 5,778,095 A | 7/1998 | Davies | 382/225 |
| 5,832,110 A | 11/1998 | Hull | 382/168 |
| 5,859,929 A | 1/1999 | Zhou et al. | 382/175 |
| 5,862,251 A | 1/1999 | Al-Karmi et al. | 382/186 |
| 6,501,856 B1 * | 12/2002 | Kuwano et al. | 382/194 |
| 6,636,631 B1 * | 10/2003 | Miyazaki et al. | 382/187 |

* cited by examiner

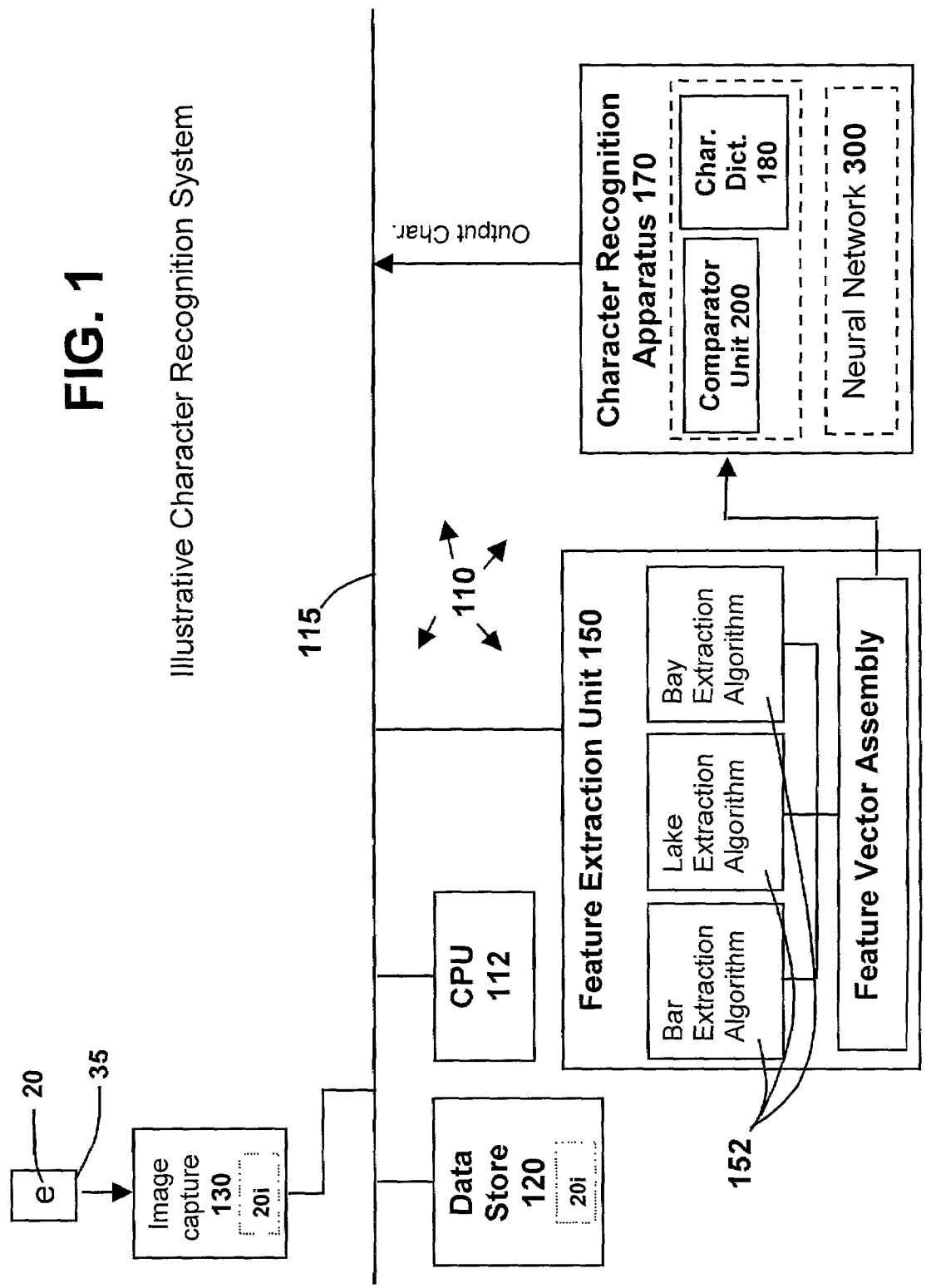

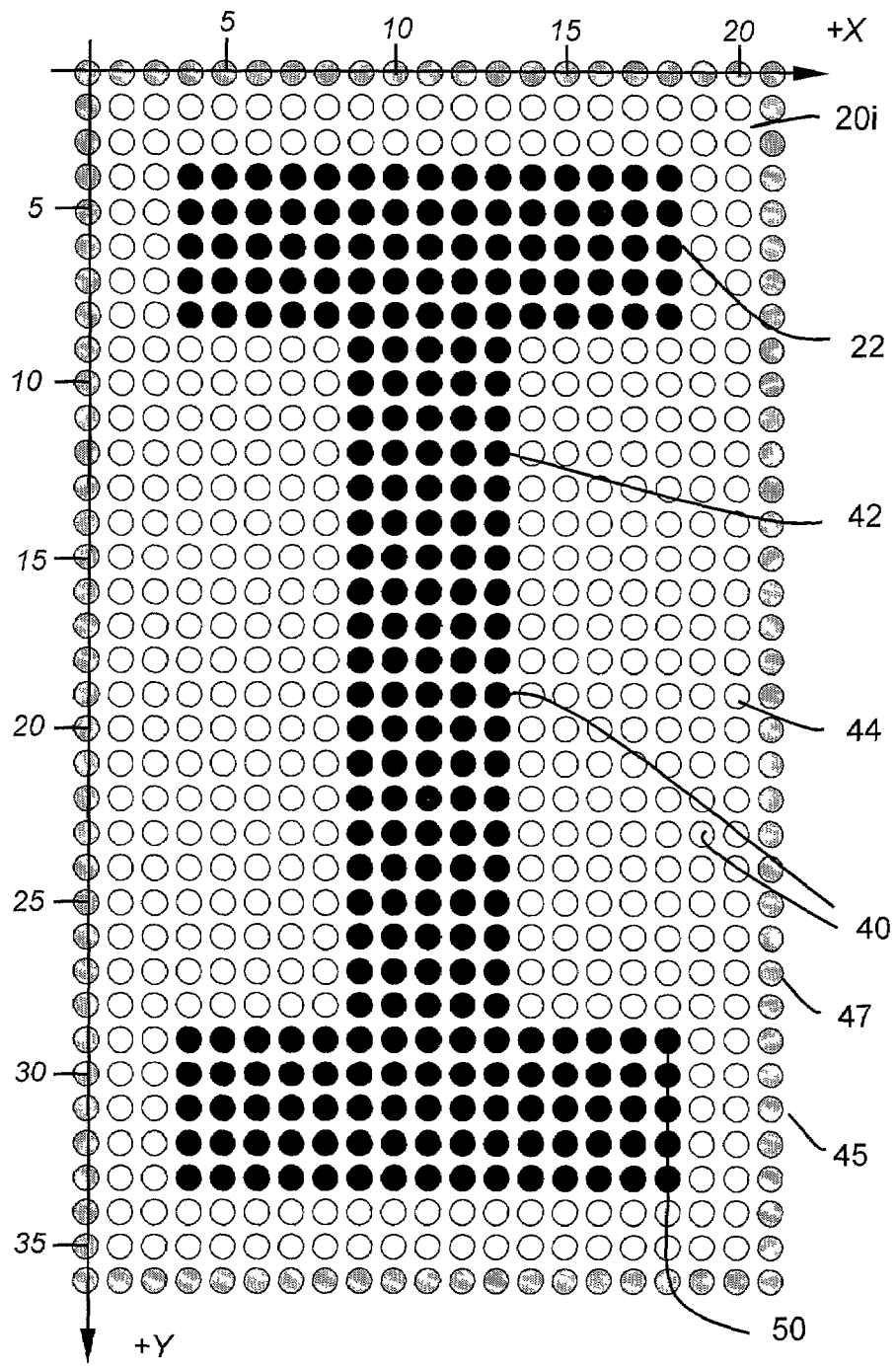
FIG. 2  Magnified character "I" revealing constituent pixels

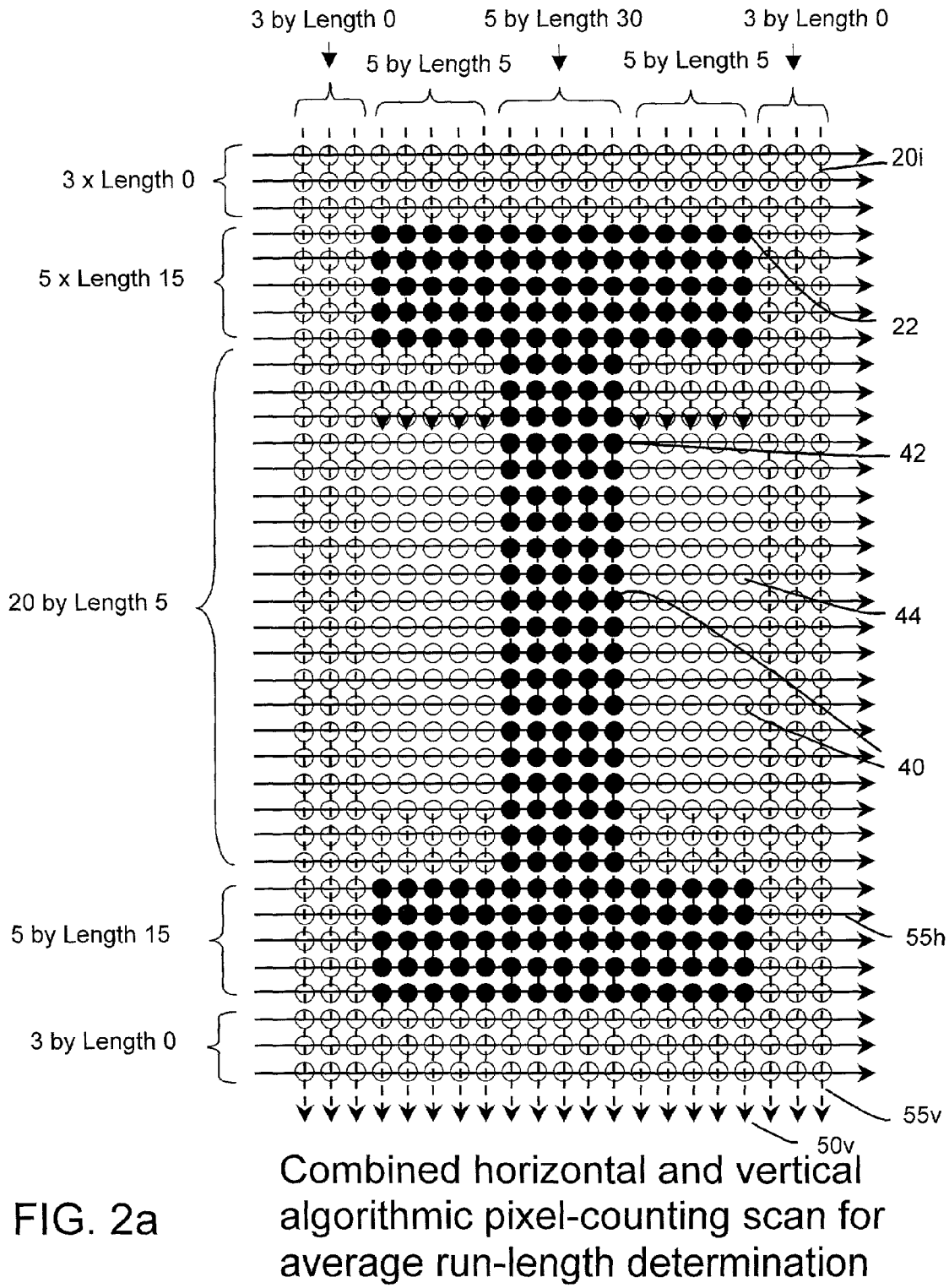
FIG. 2a  Combined horizontal and vertical algorithmic pixel-counting scan for average run-length determination

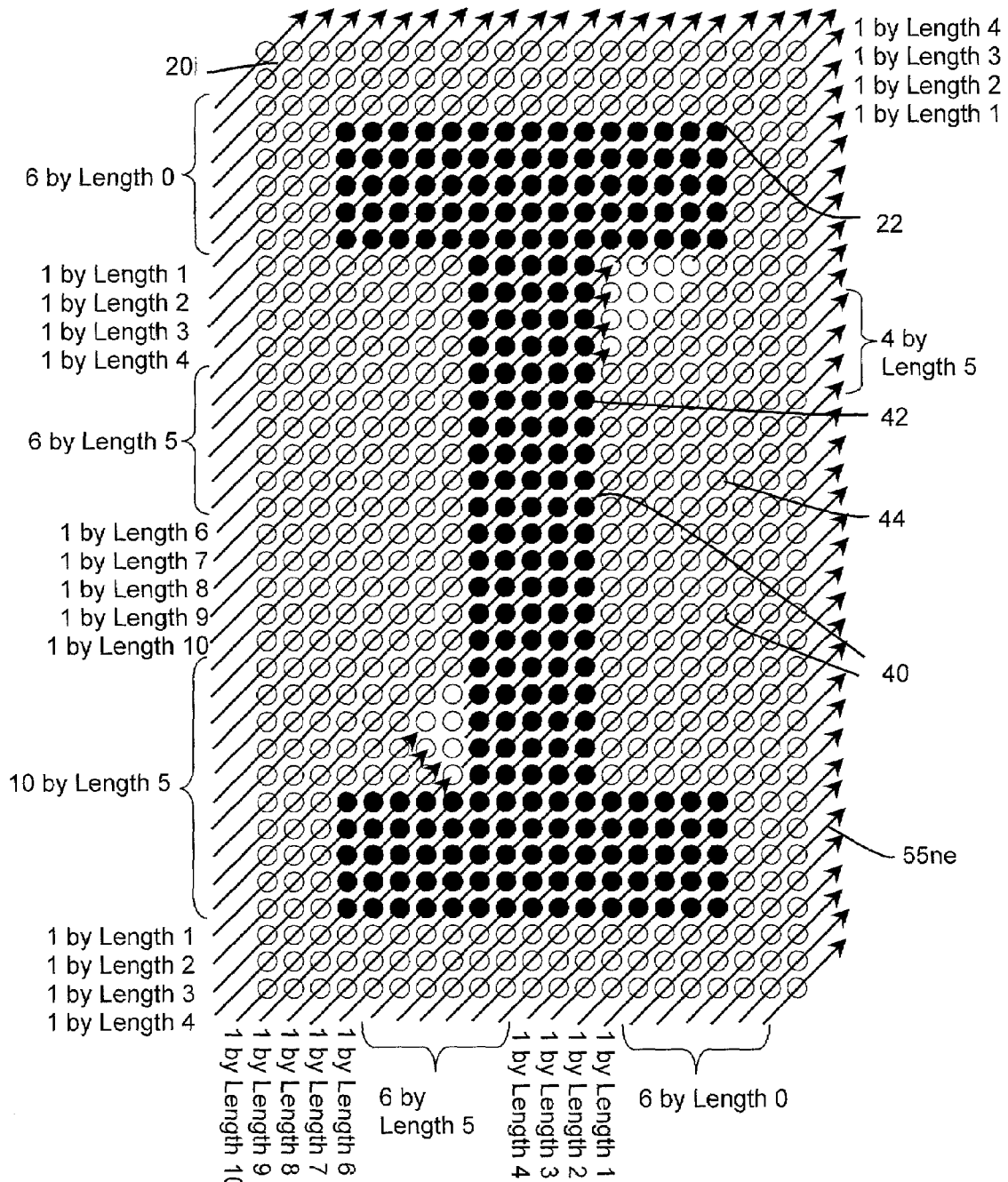
FIG. 2b  45° (northeast) algorithmic pixel-counting scan for average run-length determination

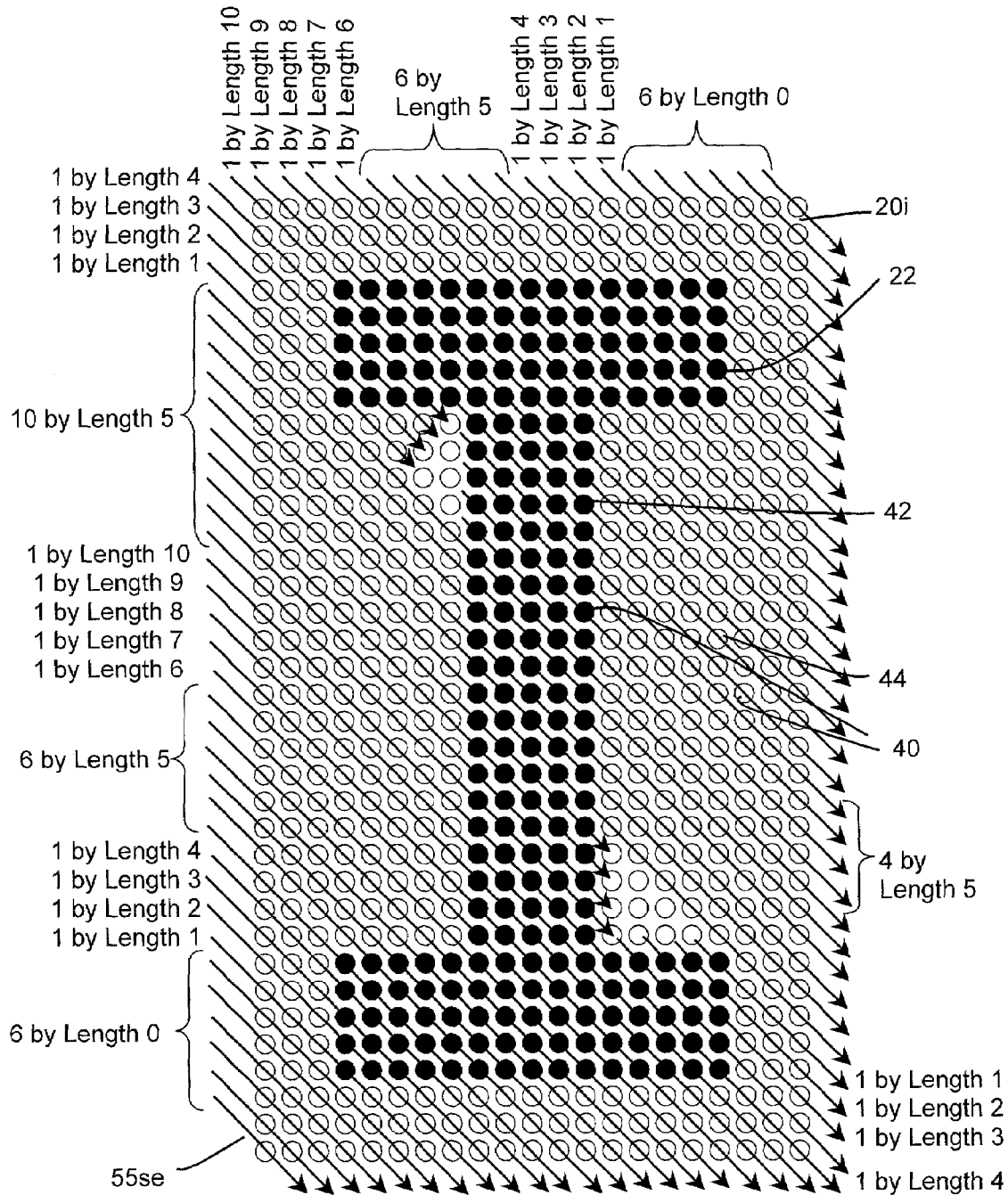
FIG. 2c  315° (southeast) algorithmic pixel-counting scan for average run-length determination Direction-specific histogram, 420h, generated from Horizontal Scan of "I" as represented in FIG. 2a Direction-specific histogram, 420ne/420se, generated from Northeast Scan of I as well as Southeast Scan of I as represented in FIGS. 2b and 2c Direction-specific histogram, 420v, generated from Vertical Scan of I as represented in FIG 2a

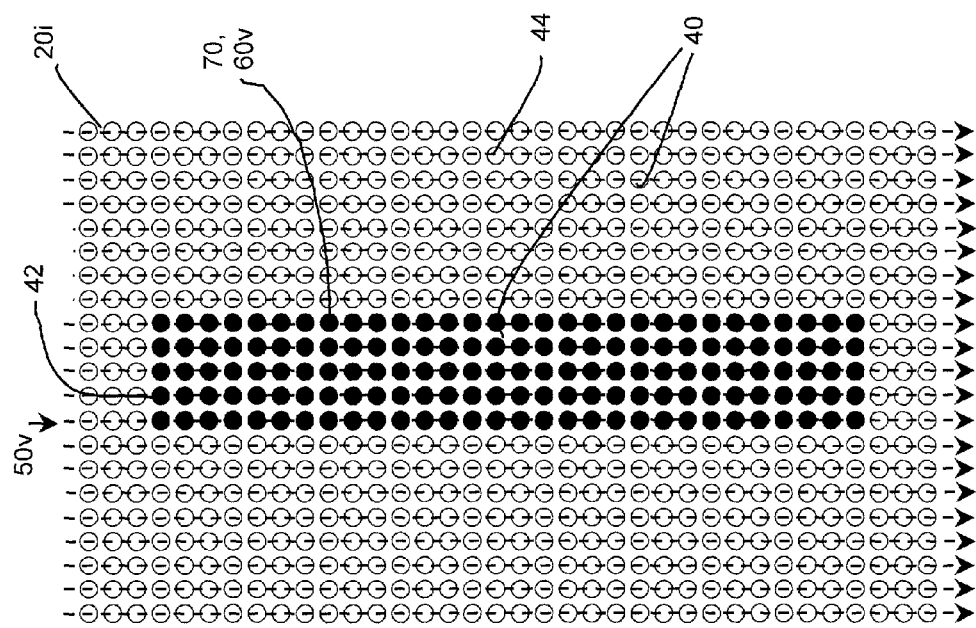
FIG. 2i  Vertical algorithmic extraction scan of the character "I"
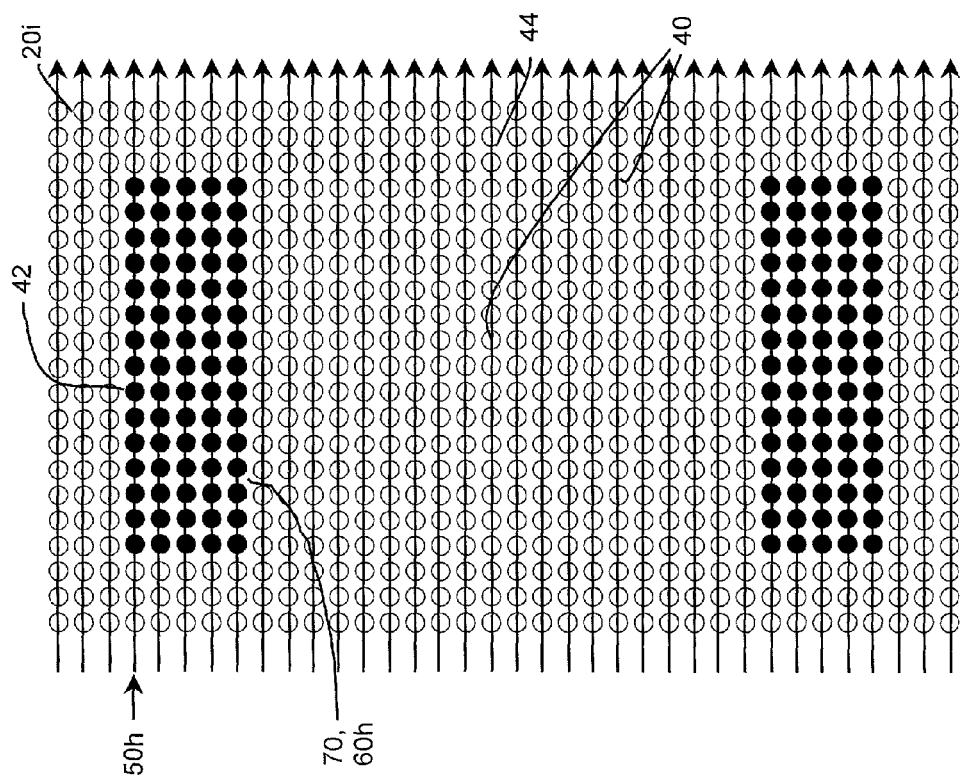
FIG. 2h  Horizontal algorithmic extraction scan of the character "I"

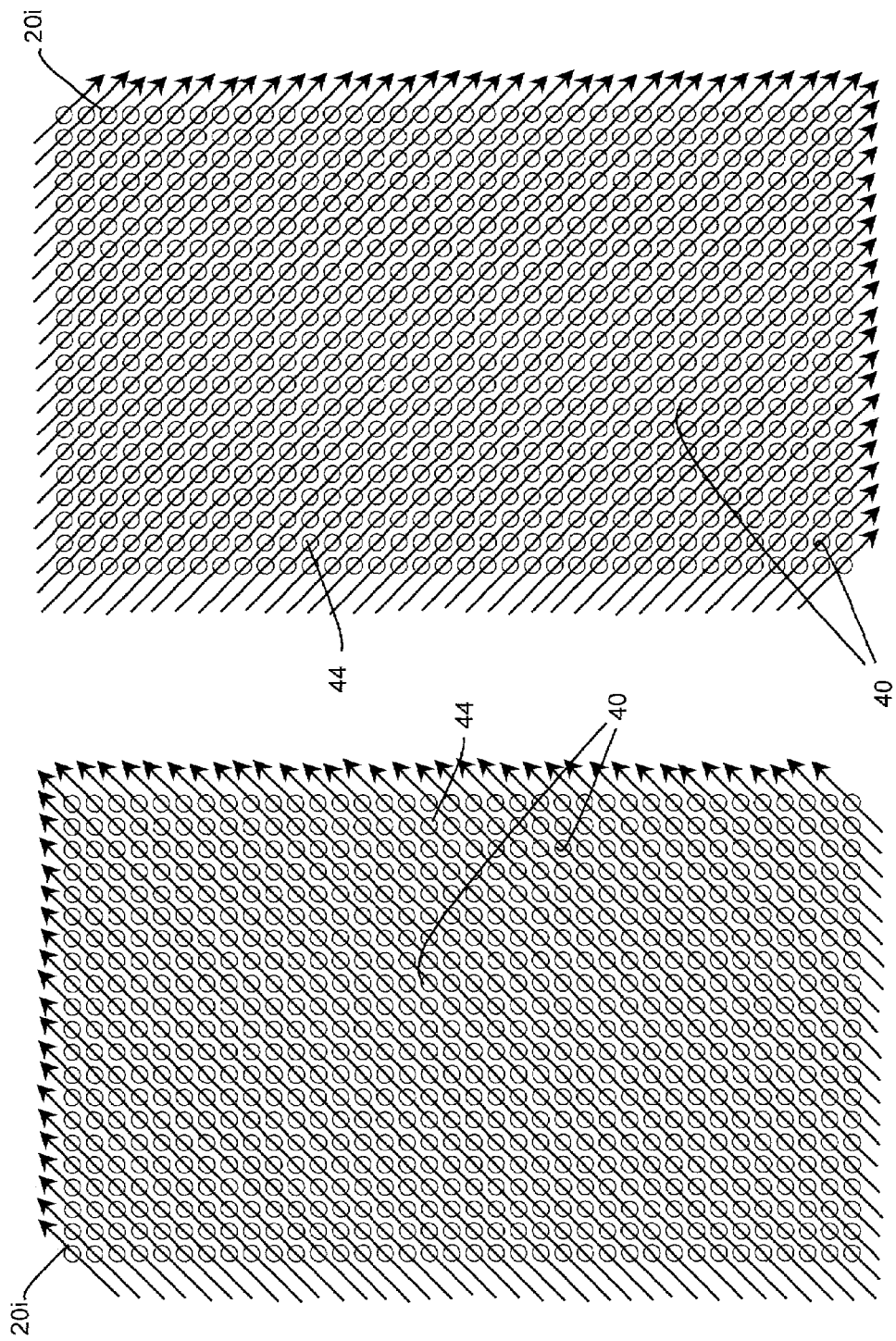
FIG. 2k  315° (southeast) algorithmic extraction scan of the character "I"
FIG. 2j  45° (northeast) algorithmic extraction scan of the character "I"

Of the 864 total character image pixels and 407 background pixels, 114 pixels are border or "edge" pixels defining the perimeter of the overall character image.

There are 864 total character image pixels situated in an array 27 character pixels wide by 32 character pixels high. There are 457 character pixels and 407 background pixels.

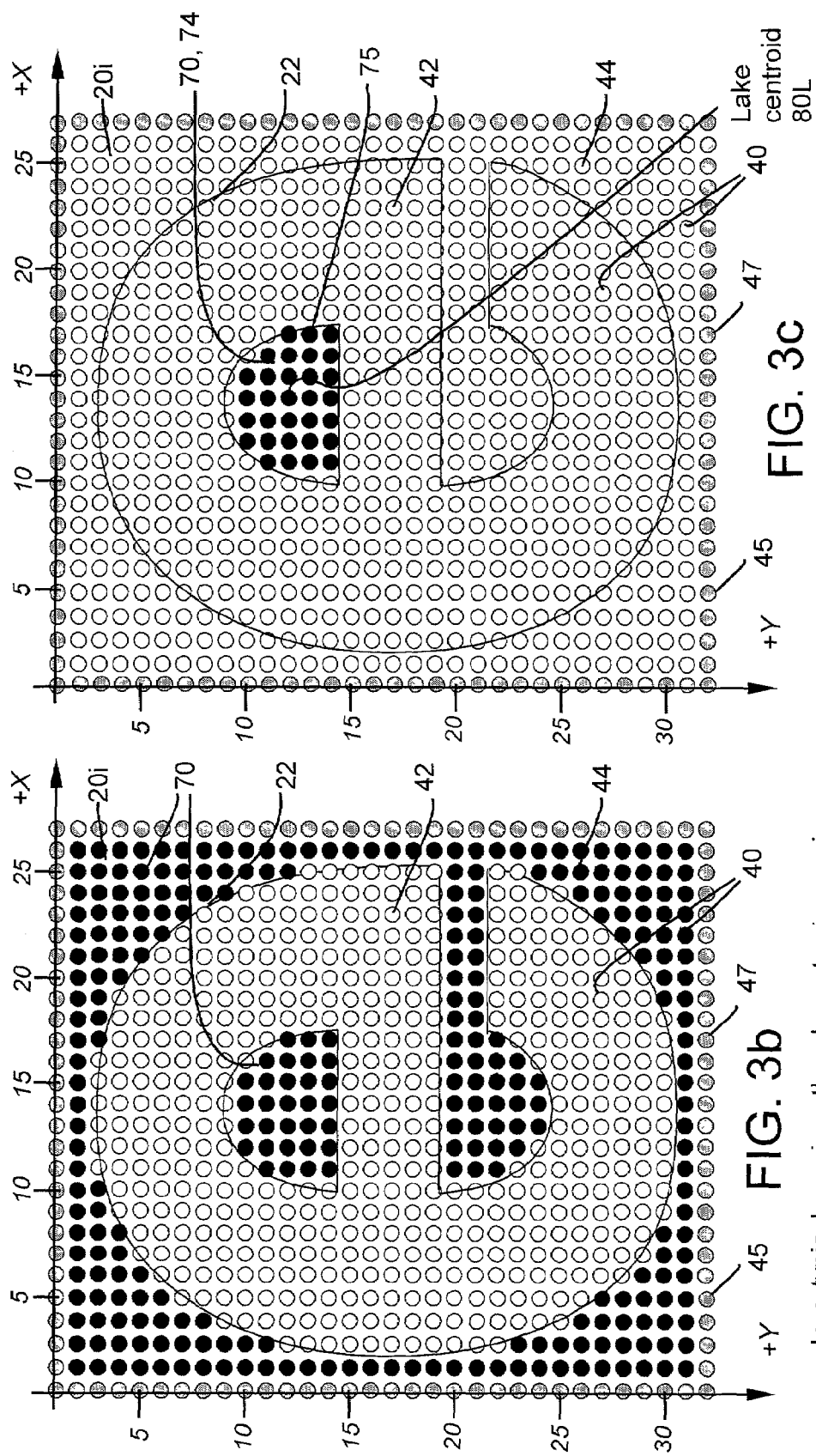

In order to isolate bays, lakes (in this case the one lake) are excluded by removing connected regions that "do not touch an edge" from the complemented character image. The single connected region remaining in this case is comprised of 369 background pixels, including the 114 border pixels.

A vertical bay-extraction scan that excludes vertical runs touching the border yields a "vertical bay" including 47 pixels and having a centroid at (16,20).

A horizontal bay-extraction scan that excludes horizontal runs touching the border yields a "horizontal bay" including 15 bay pixels with a centroid at (14,23).

A vertical bar-extraction scan yields two vertical bars, a first with 7 runs and 164 pixels and a second with 3 runs and 47 pixels.

A horizontal bar-extraction scan yields 3 horizontal bars, a first with 5 runs and 115 pixels; a second with 4 runs and 73 pixels and a third with 4 runs and 73 pixels.

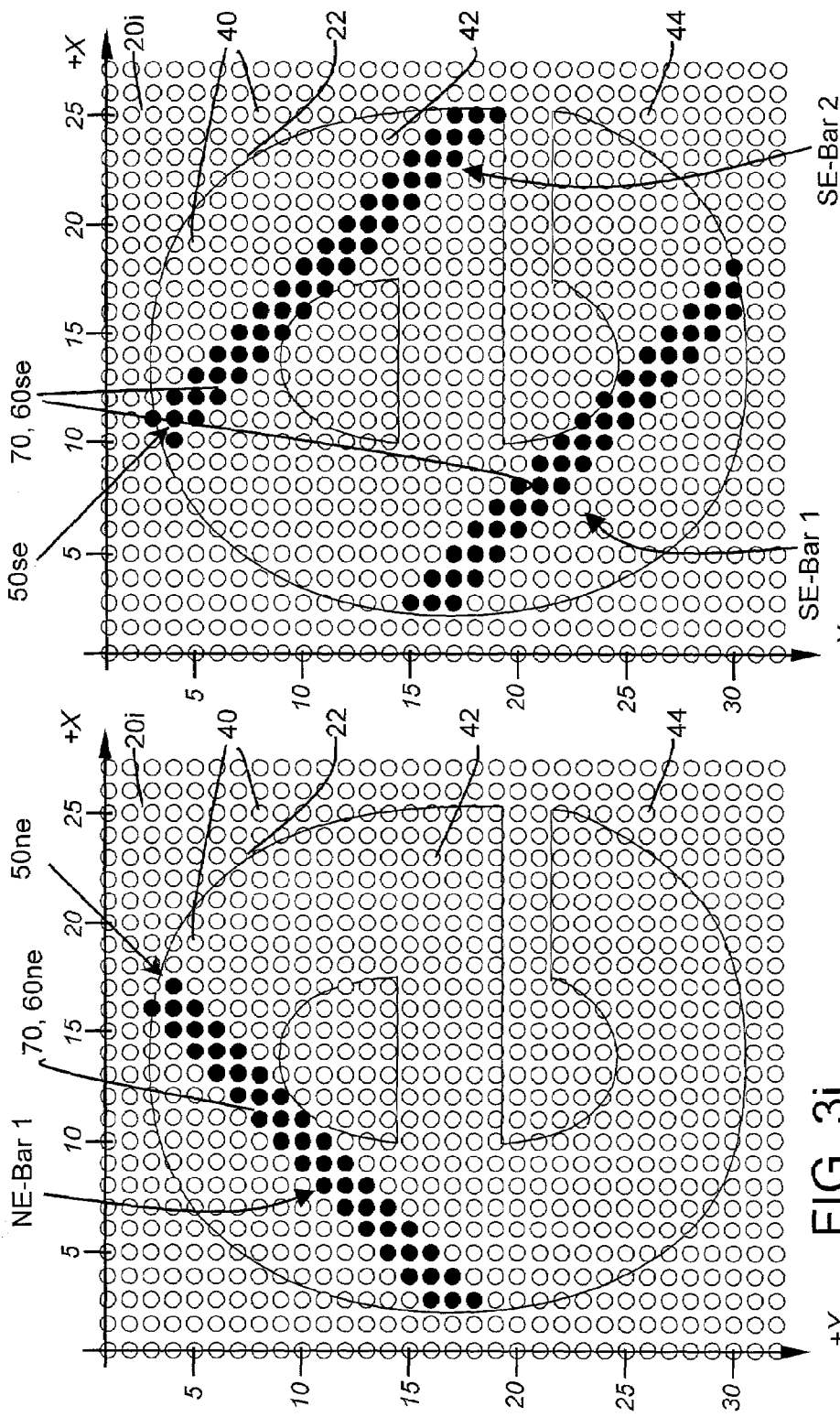
FIG. 3j — A southeast bar-extraction scan yields 2 southeast bars, a first with 3 runs and 43 pixels and a second with 3 runs and 46 pixels.
FIG. 3i — A northeast (45°) bar-extraction scan yields 1 northeast bar having 3 runs and 43 pixels Bar centroid address is (20,17) and lake centroid address is (13,13)

Bar centroid address is (6,17) and lake centroid address is (13,13)

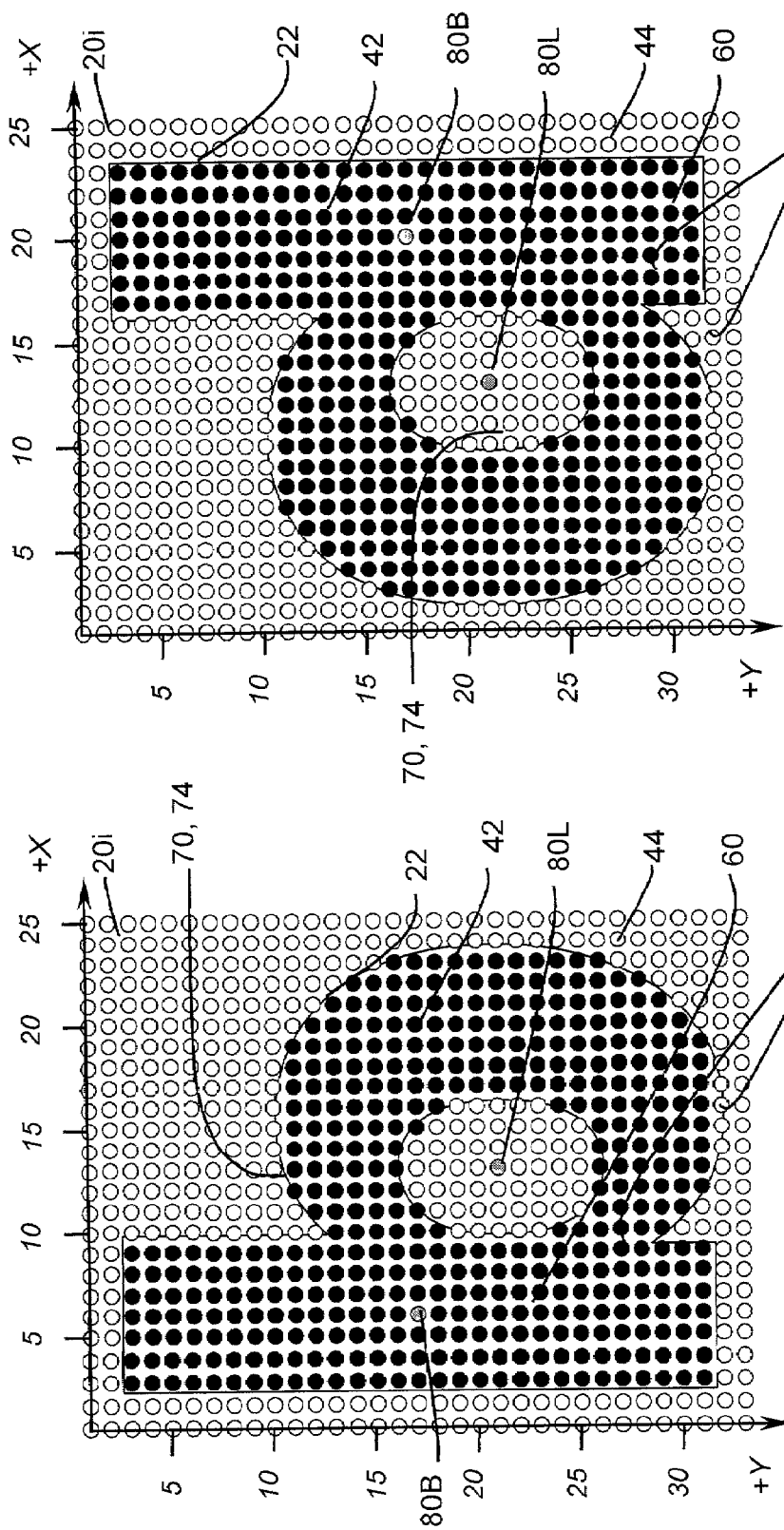

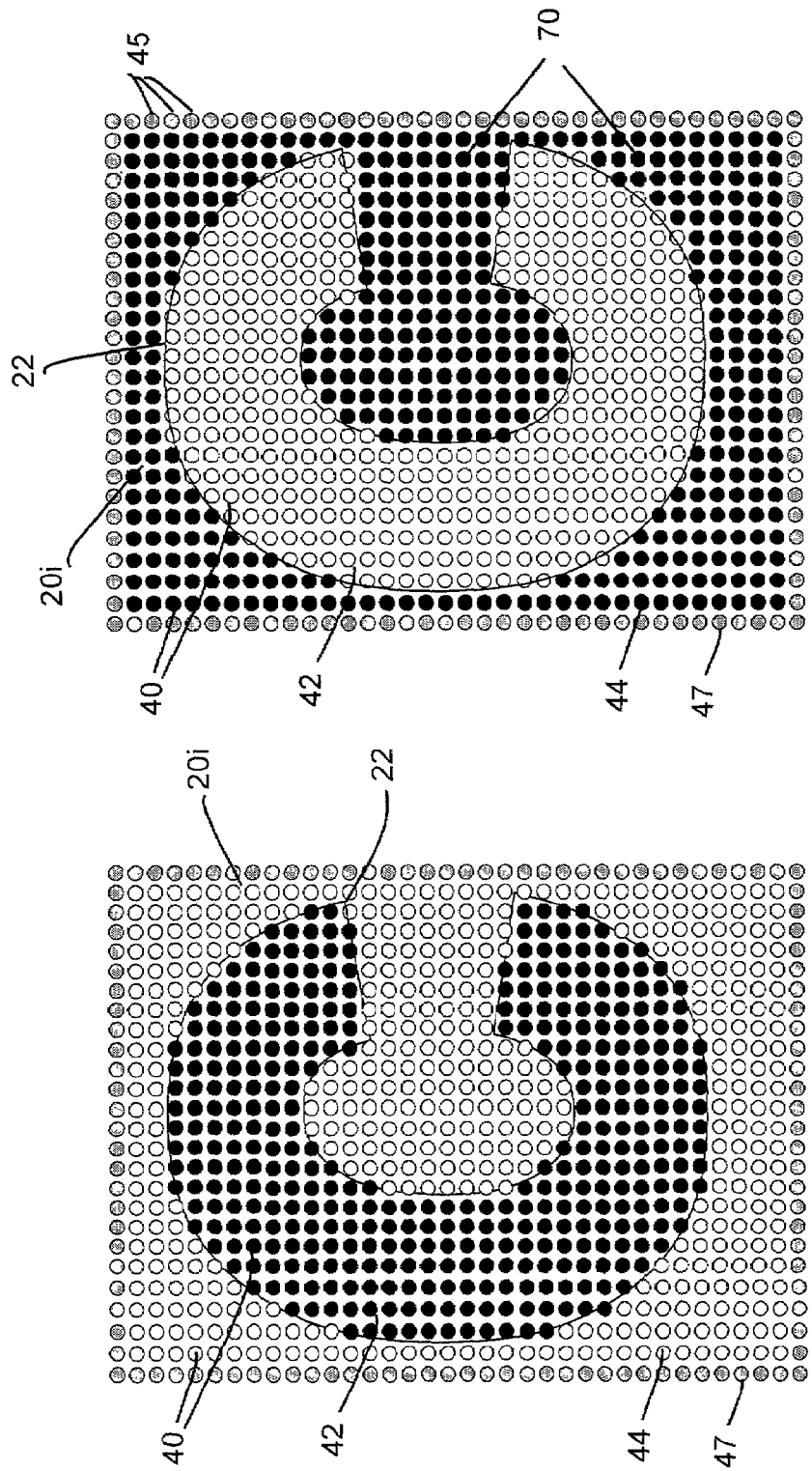
FIG. 5a  The complement of the character image in FIG. 5 including white character pixels and black background pixels.
FIG. 5  A character image including the character image character "c" comprised of black character pixels and white background pixels.

Horizontal Bar Extraction yields two horizontal bars 60h

Vertical Bar Extraction yields two vertical bars 60v

$SW_A = 7$
Extraction Threshold = $2SW_A + 1$

Northeast Bar Extraction yields one northeast bar 60ne

Southeast Bar Extraction yields one southeast bar 60se

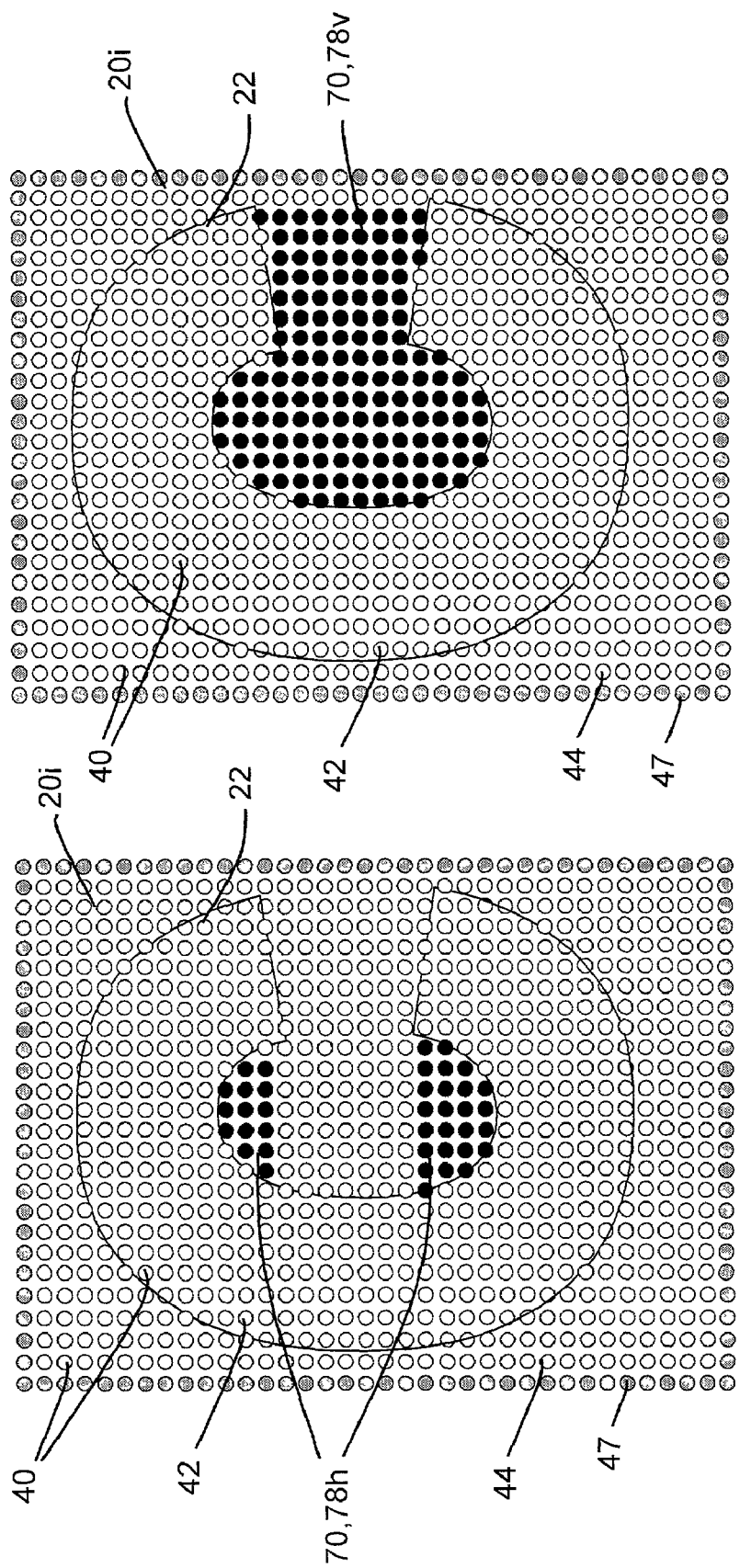
FIG. 5g  A vertical bay-extraction scan that excludes vertical runs touching the border yields a single vertical bay.
FIG. 5f  A horizontal bay-extraction scan that excludes horizontal runs touching the border yields two horizontal bays.

Illustrative assembled feature vector 30 assembled on the basis of the algorithmic extraction-scan results illustrated in FIGS. 5 through 5g.

An illustrative partial feature vector 30 includes data relating to bars 60, lakes 74 and bays 78 extracted from the illustrative character image character "e" in FIGS. 3 through 3j.

{ "C" is candidate output character indicated by comparison between assembled image feature vector of FIG. 5h and standard profiles corresponding to dictionary candidates

| Character | Bar quantity | | | | Lake quantity | Bay qty | |
|---|---|---|---|---|---|---|---|
| | h | v | se | ne | | h | v |
| A | 1 | 2 | 0 | 0 | 1 | 1 | 0 |
| B | 3 | 1 | 0 | 0 | 2 | 0 | 0 |
| C | 2 | 1 | 1 | 1 | 0 | 2 | 1 |
| D | 2 | 2 | 1 | 1 | 1 | 0 | 0 |
| E | 3 | 1 | 0 | 0 | 0 | 0 | 2 |
| F | 2 | 1 | 0 | 0 | 0 | 0 | 1 |
| G | 3 | 2 | 0 | 0 | 0 | 2 | 1 |
| H | 1 | 2 | 0 | 0 | 0 | 2 | 0 |
| I | 2 | 1 | 0 | 0 | 0 | 0 | 2 |
| J | 0 | 1 | 1 | 1 | 0 | 1 | 0 |
| K | 0 | 1 | 1 | 1 | 0 | 2 | 1 |
| L | 1 | 1 | 0 | 0 | 0 | 0 | 0 |
| M | 0 | 4 | 0 | 0 | 0 | 3 | 0 |
| N | 0 | 2 | 1 | 0 | 0 | 2 | 0 |
| O | 2 | 2 | 2 | 2 | 1 | 0 | 0 |
| P | 2 | 1 | 0 | 0 | 1 | 0 | 0 |
| Q | 2 | 2 | 1 | 0 | 1 | 0 | 0 |
| R | 2 | 1 | 1 | 0 | 1 | 1 | 1 |
| S | 2 | 0 | 1 | 0 | 0 | 2 | 2 |
| T | 1 | 1 | 0 | 0 | 0 | 0 | 0 |
| U | 1 | 2 | 1 | 1 | 0 | 1 | 0 |
| V | 0 | 2 | 0 | 0 | 0 | 1 | 0 |
| W | 0 | 4 | 0 | 0 | 0 | 3 | 0 |
| X | 0 | 0 | 1 | 1 | 0 | 2 | 2 |
| Y | 0 | 1 | 1 | 1 | 0 | 1 | 0 |
| Z | 2 | 1 | 0 | 0 | 0 | 0 | 2 |

182 — Additional vector data required to distinguish

185 — Additional vector data required to distinguish

FIG. 7

Partial standardized profile list in illustrative dictionary

A neural network being trained to recognize numerous illustrative variations of the character "A"

CHARACTER RECOGNITION SYSTEM AND METHOD USING SPATIAL AND STRUCTURAL FEATURE EXTRACTION

PROVISIONAL PRIORITY CLAIM

Priority based on Provisional Application, Ser. No. 60/252,817, filed Nov. 22, 2000, and entitled "SPATIAL AND STRUCTURAL FEATURE EXTRACTION USING RUNS" is claimed.

BACKGROUND

1. Field

Although not so limited in its utility or scope, implementations of the present invention are particularly well suited for incorporation in automated mail processing systems to facilitate the resolution of address and other character-containing images captured from mail pieces moving on a transport system, for example. Alternative implementations may be more broadly applied in other applications requiring the resolution of unknown input alphanumeric characters.

2. Brief Description of Related Art

Character recognition techniques are typified by "feature extraction" in which features of an unknown input character are selected for extraction and comparison to a standardized set of features associated with various "ideal" representations of known characters. A degree of analogy between the selected features from the unknown character and the standardized set of features corresponding to each of one or more known characters is then determined. The known character corresponding to the features having the greatest degree of analogy to the extracted features of the input character is then selected as the output character.

Varying among different recognition techniques are the features by which characters are characterized and the methods by which features of an unknown input character are selected for extraction and comparison with standardized data corresponding to known characters. There are also differences among various techniques as to how extracted information is represented and compared to standardized features. Several techniques, for example, involve representing character strokes by vectors having a magnitude (e.g., length in pixels) and a direction, the vectors being directionally classified with respect to a particular scan direction. In at least one such technique, vector representations of a character's strokes are classified according to type (e.g., angle). The number of representative vectors of each classification for a particular input character is then ascertained. Each standardized character having the same number of classified strokes as the vector representation of the input character is retrieved from memory. If more than one standardized character is retrieved for comparison to the input-character representation, then steps are initialized to ascertain which standardized character among the plural standardized characters possesses the highest degree of analogy with the profile of the unknown input character.

Some previous methods are also exemplified by the extraction of skeletal features. For instance, character strokes of a particular width in an input character are represented by a "stick-figure-like" representation in which the strokes are of substantially reduced width. One difficulty invited by such techniques is the signal-damaging effects of noise because, for instance, the thinner the representation of a feature, the closer in size the representation is to the magnitude of noise. Noise effects are discussed further in the summary section below.

In addition, the reliance of current character recognition techniques on a limited number of character feature types (e.g., strokes) limits the bases upon which one character can be distinguished from another. It will be appreciated that the more limited the feature types by which one character can be distinguished from another, the higher the likelihood of character misidentification.

Accordingly, there exists a need for a system of classifying character features and extracting the relevant features from an unknown input character that is resistant to the effects of noise and that increases the character feature types by which characters can be distinguished.

SUMMARY

According to a general set of implementations, alternative methods of recognizing an unknown input character include a combination of some or all of the steps to be described.

Various implementations include providing a character dictionary containing a plurality of standardized output character candidates. Each output character candidate has a corresponding standardized profile defined in terms of a unique combination of character structure types including, for instance, bars, lakes and bays and the spatial relationships between and among bars lakes and bays. For example, an idealized letter "B" could be defined in terms of one vertical bar, three horizontal bars and two lakes. A standardized letter "F" might be defined in terms of one vertical bar and two horizontal bars and perhaps one bay, for example.

In various aspects, standardized output character candidates are distinguished in terms of the quantity of each feature type that character possesses and, where necessary, the spatial relationship between and/or orientation of the various features types. For instance, both a "p" and a "q" could be defined in terms of one vertical bar and one lake. Defined in such terms, the quantity of each character type is not sufficient to distinguish a "p" from a "q." However, a basis for distinction between "p" and "q" is introduced by further defining the "p" as having a lake to the right of the vertical bar and the "q" as having a lake to the left of the vertical bar. Such information is still not sufficient, however, to distinguish between a "p" and a "b" and a "q" from a "d." More specifically, a "p" and a "b" may be defined as having a single lake to the right of a vertical bar. Similarly, both a "q" and a "d" are definable in terms of a lake to the left of a vertical bar. Accordingly, more data is required to distinguish "b" from "p" and "d" from "q." For instance, the "b" can be defined as having a lake to the lower right of the midpoint of the vertical bar or by some other spatial relationship that distinguishes it from "p."

In one aspect, a character image of an object character is captured from a medium such as a sheet of paper or envelope, for instance. The captured character image is stored in a data storage device from which it can be selectively accessed. The identification of the captured character image depends on the extraction of lake, bar and bay features from the character image. In various aspects, lakes, bars and bays may be described, for example, by considering a character comprised of black pixels on a field or background comprised of white pixels. A lake is an area of background composed of pixel runs extending in each of a specified number of directions (e.g., vertical, horizontal and two diagonals) wherein each pixel run is bounded at either end by character (i.e., black) pixels. That is, a lake is a region of enclosed background pixels. For instance, consider the character "e" comprised of black pixels on a white field. The "e" has a white "lake" in its upper half.

The captured character image is rendered accessible to feature extraction apparatus. In a typical implementation, the feature extraction apparatus is programmed to algorithmically generate pixel-run representations of the character image and filter predetermined features in accordance with a set of extraction parameters. The character image is scanned alone a plurality of parallel scan lines oriented at each scan angle of a predetermined set of scan angles, wherein each scan line of a selected set of scan lines oriented in accordance with each scan anale passes through each of (a) a character pixel-run including at least one character pixel and (b) at least one background pixel. The feature extraction apparatus, based on the directional scans through character pixels and contrasting background pixels, assemble a feature vector (e.g., a set of numeric data) indicative of the algorithmically extracted features.

In accordance with one set of implementations, an assembled feature vector is communicated to a comparator unit that has access to one or more character dictionaries containing standardized character feature profiles corresponding to output character candidates. The comparator unit is adapted to compare the assembled feature vector data to the data contained in the standardized character profiles in the dictionary or dictionaries to which the comparator unit has access. The comparator unit selects for output the output character candidate corresponding to the standardized profile containing data that most closely resembles the data in the assembled feature vector.

In alternative implementations, assembled character feature vectors are communicated to a neural network for identification of the characters to which they correspond. The neural network is "trained" through a process known to practitioners of the art of computer architecture as "learning by example" according to which the neural network is fed plural variations of the same character and, during the training phase, instructed as to the desired output. For instance, during training, the neural network may be supplied with dozens, or even hundreds or more, handwritten and typed versions of the letter "A." The more disparate versions of letter "A" the neural network experiences, the greater the likelihood that the neural will correctly identify unknown input characters "A" when called upon to do so.

Implementations incorporating a neural network are particularly advantageous because they avoid the need for the manual creation of a dictionary. Such manually created dictionaries require programmers to enter large numbers of variant "stock" representations of each character on the theory that the greater the number of stock representations that exist, the greater the likelihood that a sufficiently close representation will be available for matching to the unknown input character. It will be appreciated that manually created dictionaries are more rigid and commensurately more intolerant of an unknown input character's structural deviation from a preprogrammed ideal representation. That is, unknown input characters that structurally deviate too far from entries in the menu of preprogrammed output character candidates corresponding to the unknown input character may not be accurately recognized. The use of a neural network obviates the arduous task of preprogramming countless variant character representations while substantially improving the capacity for positive character identification. Advantageously, a neural network's greater tolerance for deviation from idealized character representations renders implementations employing neural networks less susceptible to the effects of noise.

An advantage realized by implementations of the present invention is a substantial reduction in the effect noise has on feature determination as compared, for example, to methods relying upon skeletal feature extraction. By way of example, for an hypothetical magnitude of noise on the order of one or two pixels, the interference with a skeletal feature that is itself on the order of 1 or 2 pixels wide could be profound, perhaps even nullifying of the skeletal feature. However, when relatively large, more "holistic" structures are the focus, noise on the order of 1 to 2 pixels in magnitude is negligible.

Another advantage associated with implementations of the present invention is that they increase the scope of features by which an unknown input character can be distinguished from other characters. Implementations of the present invention identify and make use of not only structures comprised of character pixels, but structures comprised of background pixels (e.g., lake and bays). The resultant increase in features introduced by the present invention facilitates more positive identification of characters.

BRIEF DESCRIPTION OF THE DRAWINGS

FIG. 1 depicts an illustrative character recognition system;

FIG. 2 depicts an image of illustrative character "1" comprised of pixels revealed through magnification;

FIG. 2a depicts horizontal and vertical algorithmic run-length determination scans of the image in FIG. 2;

FIG. 2b depicts a 45-degree (i.e., northeast) algorithmic run-length determination scan of the image in FIG. 2;

FIG. 2c depicts a 315-degree (i.e., southeast) algorithmic run-length determination scan of the image in FIG. 2;

FIG. 2h illustrates a horizontal bar-extraction scan of the image in FIG. 2;

FIG. 2i depicts a vertical bar-extraction scan of the image in FIG. 2;

FIGS. 2j and 2k represent, respectively, bar extraction scans of the image of FIG. 2 along the northeast and southeast directions;

FIG. 3b depicts the complement of the character image of FIG. 3 and two connected regions comprised of blackened background pixels, one connected region touching the image boundary and the other connected region not touching the image boundary;

FIG. 3c depicts the isolation of a lake in the complemented image of FIG. 3b by the exclusion of the boundary-touching connected region;

FIG. 3i depicts the results of a 45-degree (northeast) bar-extraction scan performed on the image of FIG. 3;

FIG. 3j depicts the results of a 315-degree (southeast) bar-extraction scan performed on the image of FIG. 3;

FIG. 4c shows a character image including the character image character "b" comprised of black character pixels and white background pixels;

FIG. 4d shows a character image including the character image character "d" comprised of black character pixels and white background pixels;

FIG. 5 is a character image including the character image character "c" comprised of black character pixels and white background pixels;

FIG. 5a depicts the complement of the character image of FIG. 5;

FIG. 5f depicts two horizontal bays resulting from a horizontal bay-extraction scan that excludes horizontal pixel runs that touch the image boundary from the complement image of FIG. 5a;

FIG. 5g depicts a vertical bay resulting from a vertical bay-extraction scan that excludes vertical pixel runs that touch the image boundary in the image in FIG. 5a;

FIG. 7 depicts an illustrative character dictionary including a set of standardized character profiles;

DETAILED DESCRIPTION

Figure 2D:
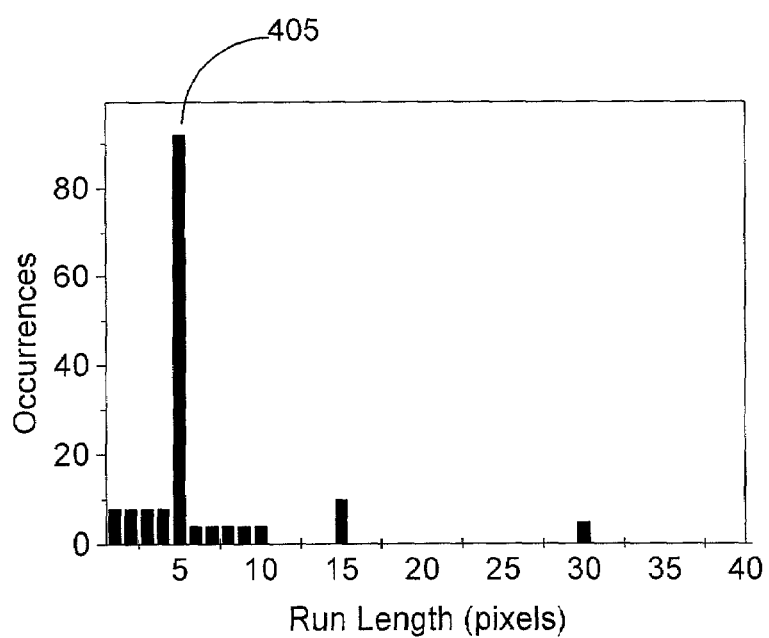
FIG. 2d is a cumulative histogram of occurrences versus run length representing the run-length data accumulated through the scans depicted in FIGS. 2a through 2c for purposes of establishing an average stroke width.
Figure 2E:
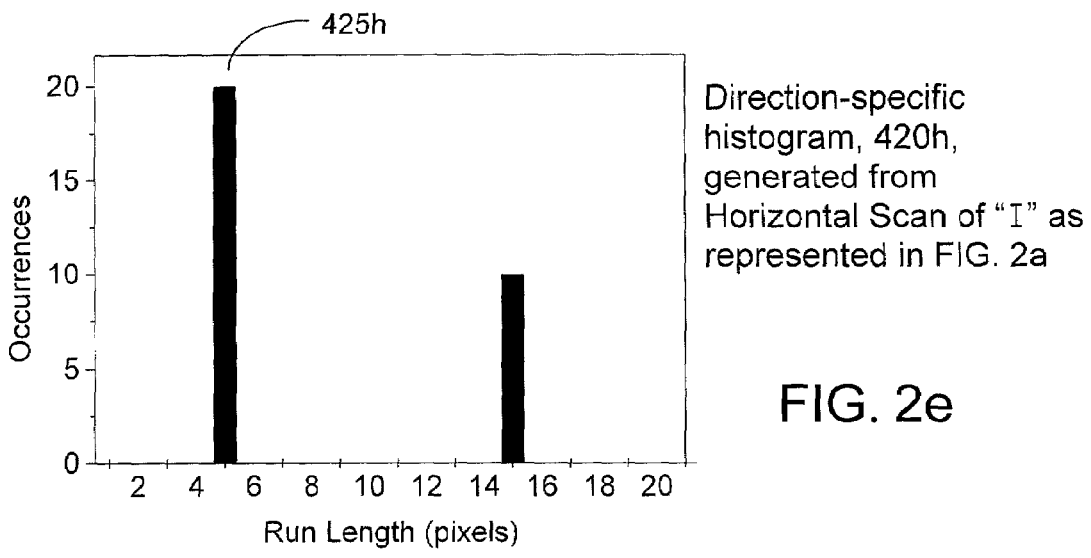
FIG. 2e is a direction-specific histogram generated from the horizontal run-length data resulting from the horizontal scan represented in FIG. 2a for purposes of establishing a direction-specific stroke width.
Figure 2F:
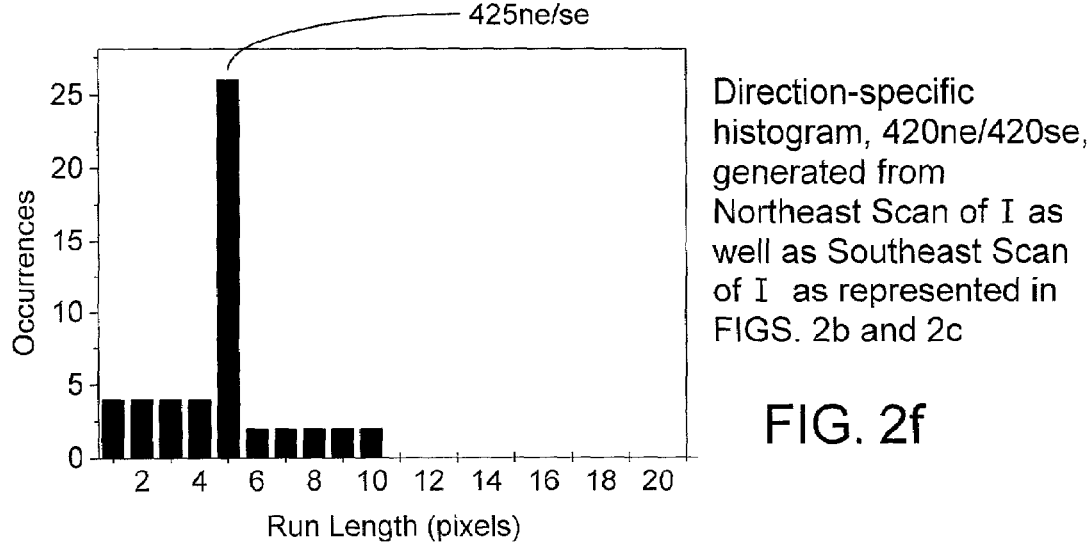
FIG. 2f is a direction-specific histogram generated from either of the northeast and southeast run-length data resulting from either of the scans represented in FIG. 2b or 2c for purposes of establishing a direction-specific stroke width applicable to either diagonal.
Figure 2G:
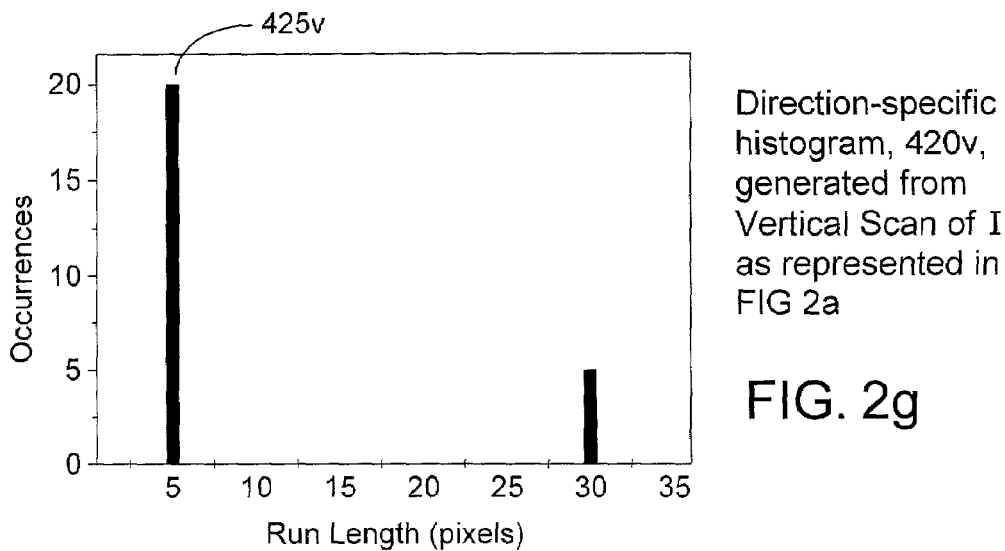
FIG. 2g is a direction-specific histogram generated from the vertical run-length data resulting from the vertical scan represented in FIG. 2a for purposes of establishing a direction-specific stroke width.

The following description of a character recognition system and method, and various implementations thereof, is illustrative in nature and is therefore not intended to limit the scope of the invention or its application of uses.

Referring to FIG. 1, an illustrative character recognition system 110 includes a central processing unit (CPU) 112; a bus 115, through which various system components are communicatively linked; a data store 120; image acquisition apparatus 130 (e.g., a camera and/or OCR scanner); a feature extraction unit 150; and character recognition apparatus 170. In one set of alternative implementations, the character recognition apparatus 170 includes a character dictionary 180 and a comparator unit 200. In another set of alternative implementations, the character recognition apparatus 170 includes a trainable neural network 300. Illustrative aspects implementing, alternatively, (i) a dictionary 180 and comparator unit 200 and (ii) a neural network 300 are discussed further in this description.

The character recognition system 110 implements a general methodology according to which alphanumeric characters are classified and distinguished from one another on the basis of unique combinations of certain, predefined character features and, for example, the quantity of each type of, and the spatial relationships among, analogous character features in an unknown object character. Implementations are characterized by reliance upon three main character structures predefined as bars, lakes and bays. The nature of each of bars, lakes and bays is more fully developed further in this description.

According to an illustrative implementation, an image 20i of an object character 20 is inputted into the character recognition system 110. For example, an object character 20 printed on paper 35 is placed in optical proximity with the image acquisition apparatus 130 and a character image 20i is captured and stored in the data store 120 as digitized image data accessible to the feature extraction unit 150.

The feature extraction unit 150 comprises a set of algorithms 152 adapted to operate on a character image 20i and systematically extract its identifying features. The set of algorithms 152 includes routines for extracting bars, lakes and bays from the character image 20i through one or more series of manipulations. Among the manipulations is the generation of pixel-run representations of the original character image 20i inputted into the feature extraction unit 150. Pixel-run representations are generated for each angle of a predetermined set of "scan" angles (e.g., horizontal, vertical, and two diagonals of 45° and 315°). Analyzed in this manner, each bar, lake and bay is treated as a configured "connected region" comprised of laterally adjacent pixel runs, an observation that will be more fully discussed further in this description. Furthermore, in various aspects, the generation of pixel-run representations in different directions results in the isolation and extraction of different features from the original character image 20i. As the character image 20i is scanned in a particular direction by an extraction algorithm, various features of the character image 20i uniquely ascertainable from that direction are identified and tracked. As features of the character image 20i are extracted, data relating to each feature of a selected set of features are stored in association with an assembled character feature vector 30 in accordance with a predetermined protocol. The assembled character feature vector 30 is then rendered accessible to the character recognition apparatus 170 for identification of the unknown object character 20 corresponding to the character image 20*i* inputted into the system 110 and from which the assembled feature vector 30 was derived.

An illustrative bar extraction process is explained in conjunction with FIGS. 2 through 2*k*. Referring to FIG. 2, a character image 20*i* includes as a character image character 22 an illustrative capital "I." The character image 20*i* is magnified to reveal the character image pixels 40 of which it is composed. A character image 20*i* typically includes character pixels 42, which combine to form the character image character 22, and background pixels 44, which form the backdrop with which the character image character 22 contrasts. The field of background pixels 44 is bounded by an image edge or boundary 45 comprised of edge pixels 47. Although character pixels 42 and background pixels 44 can each be any color of a selected plurality of colors, for purposes of discussion and illustration, the character pixels 42 are shown in black and the background pixels 44 are shown in white. In various figures, the edge pixels 47 are shown in gray for ease of identification.

According to an implementation, the average stroke width $SW_A$ of the character image character 22 within the character image 20*i* from which bars are to be extracted is first determined. The average stroke width $SW_A$ is useful in various aspects because the existence of a bar implies a degree of elongation in a particular direction. Accordingly, in various implementations, the determination of an average stroke width $SW_A$ provides a basis for establishing the relative elongation of a run of pixels and/or a laterally connected group of pixel runs (e.g., a bar), with respect to the width of the stroke orthogonal to the run. Establishing the direction of elongation angularly orients the bar and angular orientation is one basis upon which a run or bar can be characterized.

In various implementations, the average stroke width $SW_A$ is determined by determining the length of each run of character pixels 42 within the character image 20*i* along each scan line 55 extending in each direction of a specified set of directions. For example, as shown in FIGS. 2*a* through 2*c*, respectively, the character image 20*i* including the character image character "I" is algorithmically scanned horizontally, vertically, along a diagonal of 45 degrees (i.e., northeast) and along a diagonal of 315 degrees (i.e., southeast). The length of each pixel-run 50 of character pixels 42 lying along an algorithmic scan line 55 is determined for each direction of algorithmic scan. The scan lines 55 are indicated by the arrows in FIGS. 2*a* through 2*c*. It is to be understood that any desired number of predetermined scan directions can be specified. Accordingly, four scan directions are illustrative only and should not, therefore, be construed as a limitation on the scope of the invention as expressed in the appended claims. Moreover, in various aspects, different directional scans can occur simultaneously or sequentially.

As shown in FIG. 2*a*, more than a single run 50 of character pixels 42 can exist along a single scan line 55. In FIG. 2*a*, there are twenty-one vertical scan lines 55, each of which passes through thirty-six total character image pixels 40, and thirty-six horizontal scan lines 55, each of which passes through twenty-one total character image pixels 40. Consider the vertical scan lines 55 passing through character pixels 42 other than the five scan lines 55 at the center of the character image character 22. There are five vertical scan lines 55 on either side of the five center runs 50. Each scan line 55 within the two sets of five on either side of the center runs 50 includes two vertical runs 50*v*, each of which runs is five character pixels 42 in length.

In various aspects, the feature extraction unit 150 tracks such information as the quantity of runs 50, the locations of runs 50, the order of runs 50, and the quantity of character pixels 42 within each run 50 and the location of selected character pixels 42. In a typical implementation, the foregoing information is included in an assembled feature vector 30 for access and processing by the character recognition apparatus 170.

The location of a character image pixel 40, whether it is a character pixel 42 or a background pixel 44, can be expressed in terms of an address within a Cartesian coordinate system. Although the placement of the coordinate system's origin over the character image 40 is arbitrary, certain placements have become customary in the art of image processing. According to a configuration known as "orientation one," the origin of a Cartesian coordinate system is located at the upper left pixel in an image. Furthermore, while image pixels to the right of the origin are regarded as having a positive-x address component in accordance with normal mathematical convention, image pixels below the origin are regarded in "orientation one" as having a positive-y address component as opposed to a negative-y component. For purposes of illustration and explanation throughout this description and the accompanying drawings, orientation one is used. FIG. 2 is among the figures including a Cartesian system in orientation one.

There are various alternative methods of establishing the average stroke width $SW_A$ of a character image character 22. One illustrative method includes calculating the numeric average of run lengths within the character image character 22 by numerically adding all of the run lengths and dividing by the total number of runs. Where this method yields a non-whole number result, the algorithm can optionally call for the result to be rounded up or down to the nearest whole number. According to another illustrative alternative method, at least one histogram is generated and the run-length value corresponding to the peak within each histogram is established as an average stroke width $SW_A$. Two alternative approaches incorporating histogram generation are discussed below in conjunction with FIGS. 2*a* through 2*g*.

Referring to FIG. 2*d*, a cumulative histogram 400 indicates along the y-axis the cumulative number of occurrences of a particular run length over all four scan directions shown in FIGS. 2*a* through 2*c* and, along the x-axis, run lengths from one pixel to thirty-six pixels. The average stroke width $SW_A$ is estimated to be the run-length corresponding to the spike 405 in the histogram 400. In this particular example, a spike 405 in the number of occurrences (i.e., 92) corresponds with a run-length of 5 pixels. Accordingly, 5-pixels is established as the average stroke width $SW_A$ of the illustrative character image character 22 of "I." The average stroke width $SW_A$ is used to establish a base filter constant for bar extraction, for example. For instance, in the illustrative extraction scans of FIGS. 2*h* through 2*k*, the algorithmic bar-extraction scan mode ignores (i.e., does not extract) any horizontal, vertical, 45° diagonal or 315° diagonal run 50*h*, 50*v*, 50*ne* and 50*se* that is not a least 1 pixel longer than twice the average stroke width $SW_A$. That is, for purposes of this example, in order to be extracted as a bar 60 or as part of a bar 60, a run 50 must be at least $2SW_A+1$ in length. Accordingly, in the present example, because the average stroke width $SW_A$ is 5 pixels, a run 50 of character pixels 42 must be at least 11 pixels 42 in length in order to be extracted. Laterally adjacent runs 50 at least as long as the specified minimum length, and typically of substantially equal length, combine to define a bar 60.

The average stroke width $SW_A$ having been determined, algorithmic bar-extraction scans in each of the horizontal, vertical, northeast and southeast directions yield the resultant run representations shown in FIGS. 2h though 2k, respectively. More specifically, when the character "l" is scanned horizontally, two horizontally extending bars 60h, an upper bar and a lower bar, result. Each horizontally extending bar 60h is comprised of five laterally adjacent, connected runs 50h, with each run 50h meeting the criteria for extraction (i.e., each is at least 11 character pixels 42 in length) as shown in FIG. 2h. Referring to FIG. 2i, the vertical scan yields one vertical bar 60v that is thirty character pixels 42 long and five pixels 42 wide. Referring to FIGS. 2j and 2k, each diagonal scan yields zero extracted bars 60 because the longest run 50ne/50se along either diagonal scan is ten character pixels 42 in length (see FIGS. 2b and 2c), one pixel 42 less than the minimum length required for extraction.

In addition to minimum length requirements, a minimum width might also be included among the criteria for extraction. For instance, to be extracted as a bar 60, a configuration of runs 50 might be required to contain at least three laterally adjacent, connected runs 50 that meet the minimum length requirement. A suitable minimum bar width parameter would reduce the likelihood that noise on the order of, for example, a single pixel would contribute to a "false extraction."

In alternative implementations, a direction-specific histogram is generated for each direction in which the extraction algorithm scans for runs. In this way, as applied to the current example, an average stroke width $SW_A$ is determined for each of the four directions. The average stroke width $SW_A$ corresponding to any first particular direction provides a base constant for the extraction of runs extending in a second direction orthogonal to the first direction. As a practical matter, a single character-wide average stroke width $SW_A$ is sufficient to generate the desired results. However, since direction-specific average stroke widths $SW_A$ may be useful in one or more implementations, reference in made to FIGS. 2e through 2g for illustrative direction-specific histograms 420 relative to the character "l" of FIGS. 2 through 2c. A histogram 420 for each scan direction indicates, along the y-axis, the number of occurrences of a particular run length and, along the x-axis, a set of run lengths measured in character pixels 42. Unlike the cumulative histogram 400 of FIG. 2d, the peak 425 in each direction-specific histogram corresponds to the average stroke width $SW_A$ for the relevant direction. The average direction-specific stroke width $SW_A$ for a particular direction is used as a base filter constant for the purpose of extracting runs 50/bars 60 in the direction orthogonal thereto. In the current example, the direction-specific stroke width $SW_A$ indicated by the direction-specific histogram 420 for each of the four scan directions happens to coincide with the cumulative average stroke width $SW_A$ established by the cumulative histogram 400 of FIG. 2d. Although such agreement may not always be present, particularly when irregularly configured character image characters 22 are involved, the cumulative average stroke width $SW_A$ is typically sufficient to extract the runs 50 and bars 60 desired from an overall character image character 22.

Figures 3, 3A:
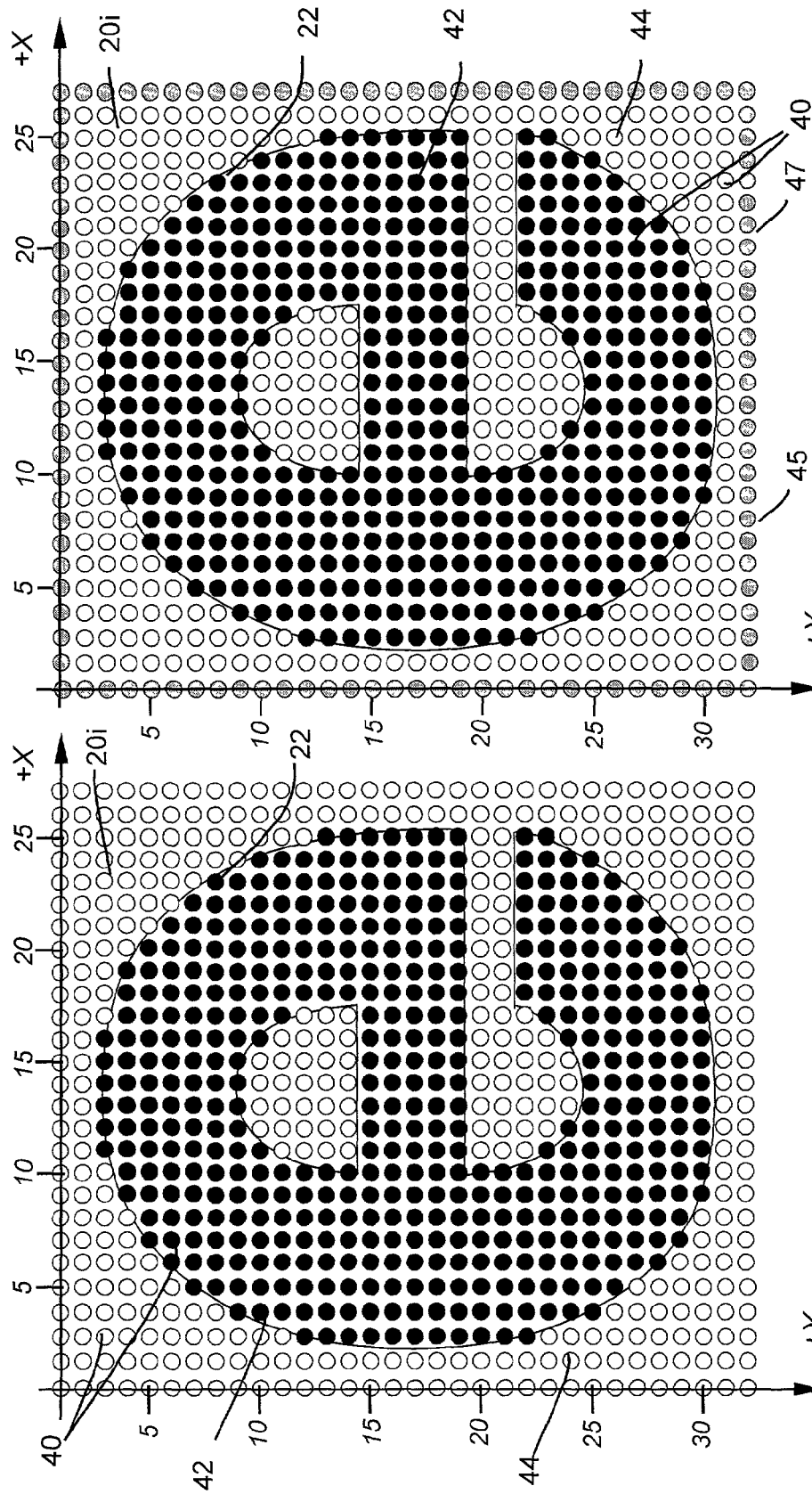
FIG. 3 depicts a character image comprised of character image pixels and including the character image character "e;"
FIG. 3a depicts the character image shown in FIG. 3 with the edge pixels shaded to facilitate identification of the image boundary.

FIGS. 3 through 3c illustrate a methodology of isolating and extracting lakes. Referring to FIG. 3, an illustrative character image 20i includes a character image character 22 "e" comprised of black character pixels 42. In FIG. 3a, the boundary or edge 45 of the character image 20i is comprised of edge pixels 47, which are indicated in gray for ease of identification. The character image 20i of FIGS. 3 through 3c includes 864 total character image pixels 40 of which 457 pixels are character pixels 42 and 407 are background pixels 44.

According to one lake extraction method, the character image 20i is first "complemented." For example, where the character pixels 42 in the original character image 20i are black and the background pixels 44 white, the colors are reversed so that the character pixels 42 are white and the background pixels 44 are black. As shown in FIG. 3b, when the character image 20i including the character image character 22 "e" is complemented, what remains are two separate black "connected regions." Each black connected region 70 is comprised of laterally adjacent pixel runs 50 of varying lengths. Next, in general accordance with the illustrative method under consideration, each connected region 70 that touches the image boundary 45 of the character image 20i is removed (i.e., filtered away and eliminated from consideration). As shown in FIG. 3c, the smaller connected region 70 does not touch the image edge 45 of the character image 20i, but the larger connected region 70 does. Accordingly, as shown in FIG. 3c, the larger connected region 70 is eliminated from consideration, leaving only the smaller connected region 70 which, by elimination, must be a lake 74. Once the character image 20i has been filtered to isolate the lakes 74, numeric information concerning the lakes 74 is ascertained and added in the appropriate array indices of a feature vector. For instance, one item of information about a lake 74 that may be useful is the address (e.g., x-y coordinates) of its "centroid."

The centroid of a bar, lake or bay may be alternatively defined. However, it is advantageous to treat the centroid of a connected region as analogous to the center of mass of a uniformly dense, two-dimensional mass. A second illustrative definition defines a centroid as the intersection between a first central pixel run extending in the direction of orientation of the connected region and a second central pixel run extending in the direction orthogonal to that of the first central pixel run. In various aspects, either definition will result in the same point or pixel being identified as the centroid as, for example, in the case of regularly shaped connected regions such as rectangular bars comprised of odd numbers of pixel runs in each of the two directions.

As shown in FIG. 3c, the centroid 80 of the lake 74 was calculated as a "center of mass," and resides at X=14, Y=12 within the character image 20i. Although those of even minimal skill in physics or image processing know the calculation of the center of mass of an object, or the centroid of a connected region of pixels, a brief explanation of the illustrative method used in the examples throughout this description is warranted. The quantity of lake pixels 75 at each x and y location are summed and then divided by the total number lake pixels 75. For instance, in FIG. 3c, there are 31 lake pixels 75 distributed with the following x addresses with the product of the lake pixels 75 at each x location and the value of the x location appearing in parentheses: 4 pixels at x=11 (44); 5 pixels at x=12 (60); 5 pixels at each of x=13 (65); 5 pixels at x=14 (70); 5 pixels at x=15 (75;) 4 pixels at x=16 (64) and 3 pixels at x=17 (51). The summation of the preceding parenthetical quantities equals 429 and 429 divided by 31 lake pixels 75 equals 13.8. Since it is not typically tenable to express positions in fractional pixels, the x and y positions of a centroid are taken to be at the nearest whole number position. A similar summation for the y-positions of the 31 lake pixels 75 in FIG. 3c indicates that the y-location of the centroid 80 is at y=12. Therefore, the address of the lake centroid 80 is (14,12). Again, although the position of a connected region centroid can be alternatively determined, the various centroids discussed throughout this description were calculated using the foregoing illustrative method.

In various aspects, information about the centroids 80 of bars, lakes, and bays is useful, for example, in establishing the relative, distinguishing orientations and spatial relationships of character features. Consider the character images 20i including the character image characters 22 "p," "q," "d" and "b" illustrated in FIGS. 4a through 4d. Each of these character images 20i is comprised of one bar 60 and one lake 74. More specifically, but indistinguishably, each is comprised of one vertical bar 60v and one lake 74. More information is required in order to distinguish among these character image characters 22. By providing the locations of the bar centroid 80B and the lake centroid 80L for each of these character image characters 22, the character images 20i are distinguished from one another. For example, consider the character images 20i in each of FIGS. 4a–d relative to the superimposed Cartesian coordinate system. As previously discussed, although origin placement is arbitrary as long as consistency is maintained, the origin in each of FIGS. 4a–d is taken at the top left character image pixel 40 in the overall character image 20i in accordance with "orientation one." The character image characters 22 in FIGS. 4a–d are distinguishable on the basis of the x and y values defining the address of the lake and bar centroids 80L and 80B in each of the four character images 20i. For instance, consider "p" and "q" of FIGS. 4a and 4b. Although in these particular examples, the lake centroid 80L in each character image 20i is at (13,13), "p" is distinguishable from "q" on the basis that the address of the bar centroid 80B in "p" has a lower x-value than the x-value of the lake centroid 80L in "p," while the x-value of the bar centroid 80B in "q" is higher than the x-value of the lake centroid 80L in "q." The x-value distinction is not alone sufficient, however, to distinguish the "p" in FIG. 4a from the "b" in FIG. 4c. However, "p" and "b" are distinguished by observing that the y-value of the bar centroid 80B in "p" is higher than the y-value of the lake centroid 80L in "p." Contrarily, in "b" of FIG. 4c, the y-value of the bar centroid 80B is lower than the y-value of the lake centroid 80L.

Another character feature important to various implementations of the invention is a bay. According to a set of implementations, bays, like lakes, are extracted by generating the complement of a character image. Unlike a lake, a bay belongs to a connected region of pixels that touches the boundary of the character image. Accordingly, lakes can be eliminated from consideration by filtering away any connected regions that do not touch a character image boundary. Removal of the lakes in the complemented character image leaves only the connected regions containing bays, if any. The bays are isolated within the connected regions remaining after elimination of the lakes by filtering away pixels runs within the remaining connected regions that touch the character image boundary.

Consideration of the complemented character image 20i of "e" in FIG. 3b, and FIGS. 3d through 3f, facilitate an appreciation of a bay extraction aspect. As discussed in connection with lake extraction, the complemented character image 20i of FIG. 3b includes two distinct connected regions 70 comprised of blackened background pixels 44, each of which pixels 44 has at least one neighbor. When the connected region 70 that does not touch an edge (i.e., the lake 74) is filtered away, only the single connected region 70 shown in FIG. 3d remains. A subset of connected background pixels 44 within the remaining connected region 70 constitutes a bay 78.

In a typical aspect, bays 78 are isolated and extracted by filtering pixel runs 50 that touch an image edge 45 out of a connected region 70 that touches and/or includes an image edge 45. Additionally, each end pixel of a pixel run 50 within a remaining bay 78 typically neighbors a character pixel 42. Moreover, the configuration, or even the existence, of a bay 78 may depend upon the direction in which an edge-touching connected region 70 is algorithmically scanned to filter away the runs 50 within that connected region 70 that touch an image edge 45.

Figure 3D:
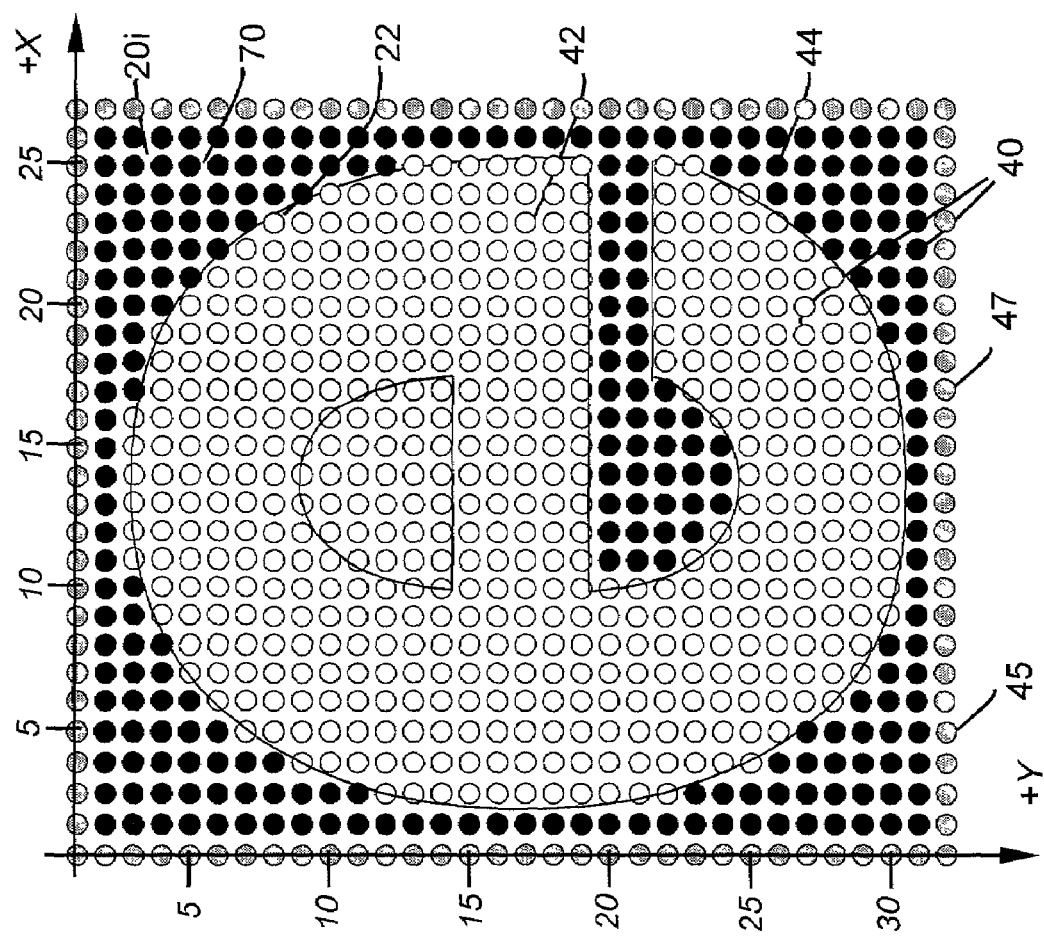
FIG. 3d illustrates the isolation of the boundary-touching connected region shown in the complemented image of FIG. 3b achieved by the exclusion of the connected region that does not touch the image boundary.
Figures 3E, 3F:
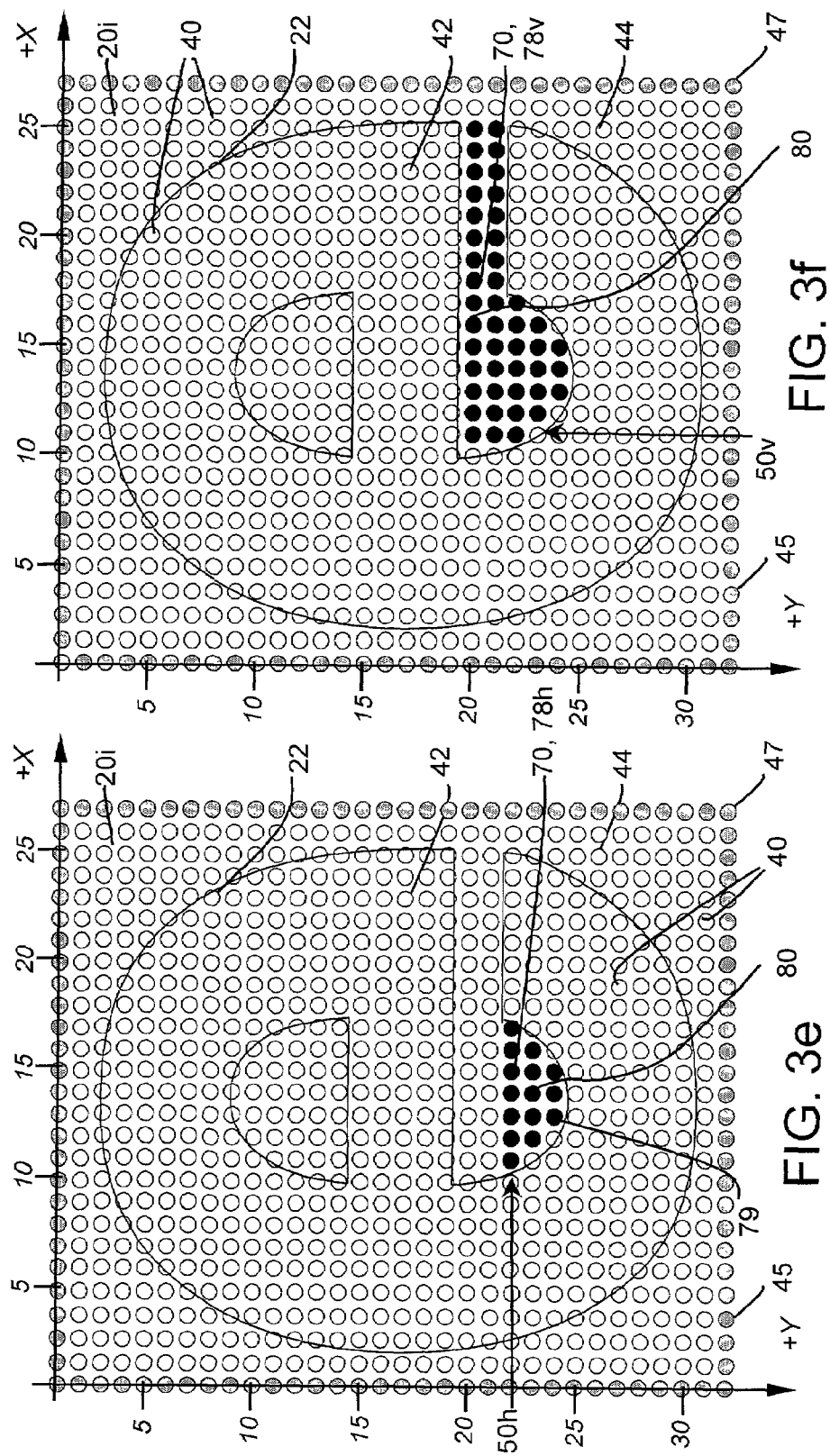
FIG. 3e depicts a horizontal bay resulting from a horizontal bay-extraction scan of the image in FIG. 3d that excludes horizontal pixel runs that touch the image boundary.
FIG. 3f depicts a vertical bay resulting from a vertical bay-extraction scan of the image in FIG. 3d that excludes vertical pixel runs that touch the image boundary.

An appreciation for the directional dependence of bay configuration is enhanced by reference to FIGS. 3e and 3f. FIG. 3e illustrates the resultant horizontal bay 78h when the edge-touching connected region 70 remaining in FIG. 3d is algorithmically scanned horizontally to exclude all runs 50 that touch the image boundary 45. Contrast the configuration of the bay 78h resulting from the horizontal scan with that resulting from the vertical scan in FIG. 3f. Among other obvious differences in configuration, the vertical bay 78v of FIG. 3f includes forty-seven bay pixels 79 to the horizontal bay's seventeen bay pixels 79.

In a typical implementation, the particular configuration of a bay is less important than, for example, the quantity of bays and their spatial relationships with other extracted features (e.g., other bays, lakes and bars). In the case of the "e" above, although the directions of algorithmic scan resulted in bays 78h and 78v of different configuration, there was no difference in the quantity of bays 78 resulting from the two scans. For some character image characters, this will not be the case. That is, for some character image characters, the number of bays identified when the character image is scanned in a first direction will differ from the number of bays identified when that same character image is scanned in a second direction. The quantity of a particular kind of feature (e.g., bays) extracted in each of a plurality of predetermined directions is, in various implementations, among the data included in the feature vector associated with a character image.

An example of directional dependence of feature quantity is considered in conjunction with the character image 20i of FIGS. 5 and the manipulated representations thereof in FIGS. 5f and 5g. Shown in FIG. 5 is a character image 20i including the character image character 22 "c." The complement of the character image 20i in FIG. 5 is shown in FIG. 5a. As illustrated in FIG. 5f, filtering the complement of the character image 20i of "c" in the horizontal direction to exclude horizontally extending runs 50h that touch the image boundary 45 yields two bays 78, an upper horizontal bay 78h and a lower horizontal bay 78h. When the character image 20i of "c" is algorithmically filtered in the vertical direction, as in FIG. 5g, a single bay 78 filling the interior of the "c" from top to bottom is yielded. As with bars 60, various implementations treat bays 78 as having an orientation depending on the direction of algorithmic scan used to isolate and extract them. Accordingly, a feature vector corresponding to "c" might include indications that the character image 20i of "c" includes two horizontal bays 78h and one vertical bay 78v. FIGS. 5 through 5g are revisited later in this description in connection with an associated character feature vector 30 shown in FIG. 5h.

Before discussing an illustrative feature vector in connection with the character image 20i in FIGS. 3 through 3j, reference is made to FIGS. 3g through 3j which illustrate bar extraction results for each of four directions in association with the character image character 22 "e." For purposes of illustrating bar extraction in FIGS. 3g through 3j, a 7-pixel average stroke width $SW_A$ is assumed. Moreover, pixel runs 50 that are at least $2 \times SW_A$ meet the minimum threshold for extraction in each of the four scan directions illustrated.

Figures 3G, 3H:
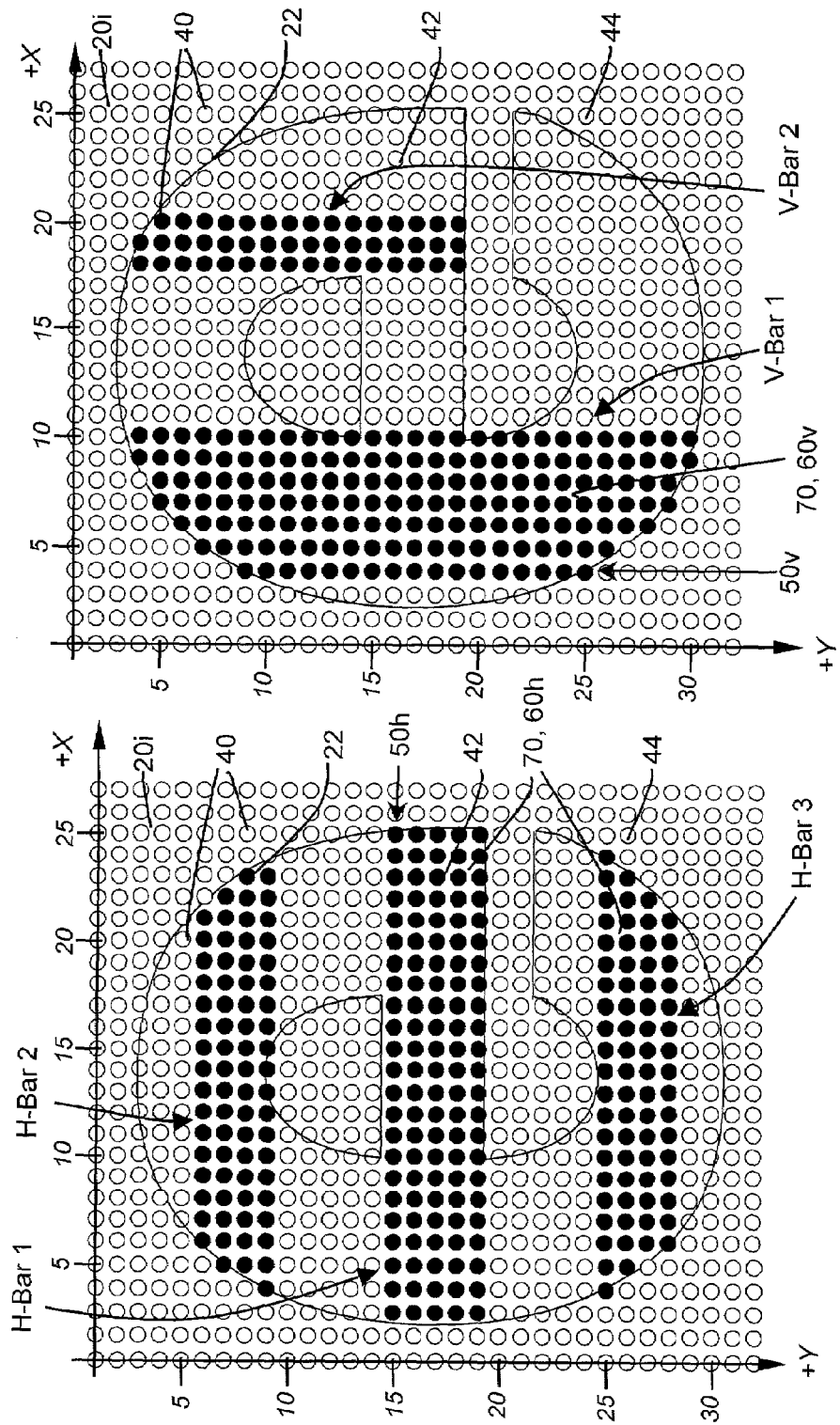
FIG. 3g depicts the results of a horizontal bar-extraction scan performed on the image of FIG. 3.
FIG. 3h depicts the results of a vertical bar-extraction scan performed on the image of FIG. 3.
Figure 4B:
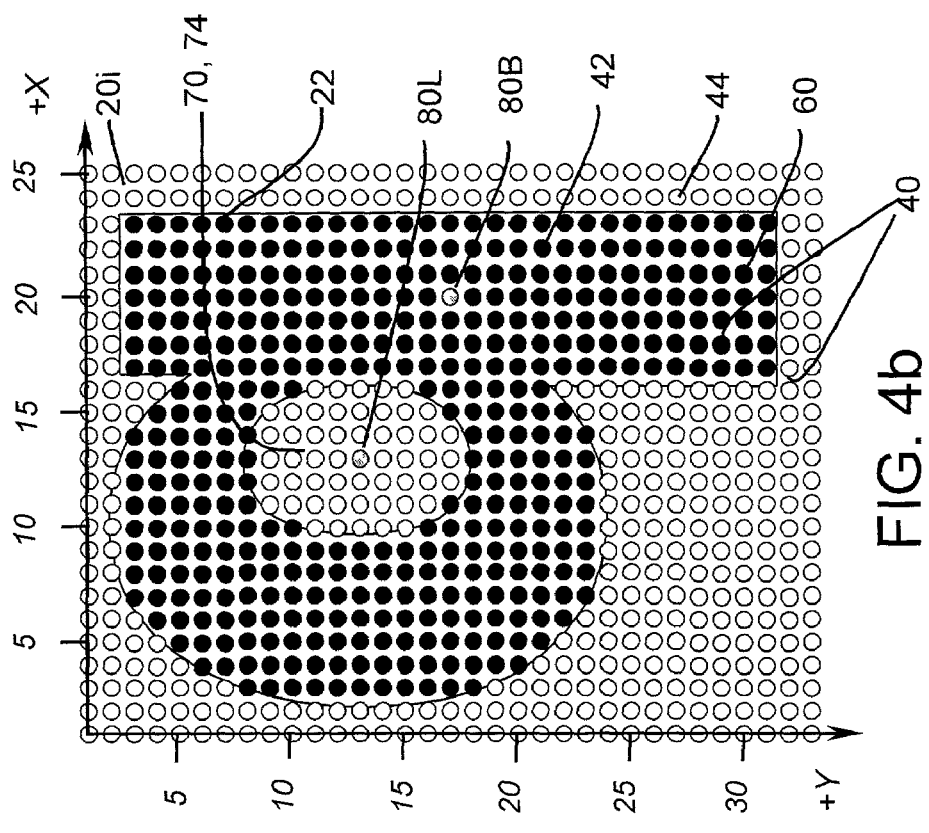
FIG. 4b shows a character image including the character image character "q" comprised of black character pixels and white background pixels.
Figure 4A:
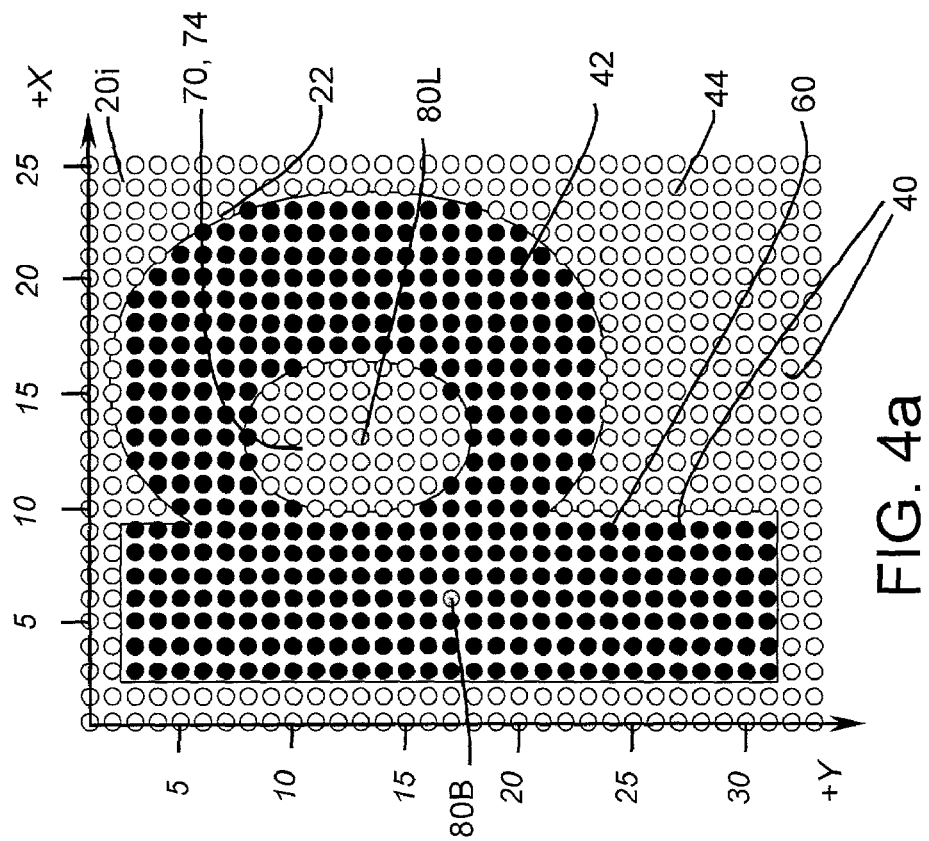
FIG. 4a shows a character image including the character image character "p" comprised of black character pixels and white background pixels.

The horizontal bar-extraction scan of FIG. 3g yielded three horizontal bars 60h. A first horizontal bar 60h (the bar in the center) includes five runs 50h. Each run 50h is twenty-three character pixels 42 in length for a total of 115 character pixels 42 in the first bar 60h. Each of the five runs 50h in the first bar 60h begins at x=3 and ends at x=25. The first run 50h of the first bar 60h has a y-value of 15, while the second through fifth runs 50h have y-values of 16, 17, 18 and 19, respectively.

The location of the first bar 60h, as with any connected region 70, may be additionally or alternatively expressed in terms of a "bounding box" defined by the x-y addresses of four character image pixels 40 at the corners of the box. For instance, the first bar 60h in FIG. 3g could be expressed in terms of the four character pixels 42 at (3,15); (25,15); (3,19) and (25,19). Although the location of any type of connected region 70 (e.g., bar, lake or bay) can in theory be indicated by a bounding box, rectangular connected regions 70 (i.e. bars 60) are particularly well suited for such identification for obvious reasons. The runs 50 within a connected region 70 can also be located by the number of the scan line 55 in the direction-specific run representation corresponding to a scan direction or as a run number within an identified connected region 70, for example. For instance, the location and size of the top run 50 in the first bar 60 of FIG. 3g might be alternatively expressed as (i) "scan line 15, begin 3, end 25;" (ii) "scan line 15, begin 3, length 23;" or "bar 1, run 1, begin 3, end 25, length 23," for example. The same run 50 could also be identified as simply as "begin (3,15); end (25,15)." The particular manner in which run information is expressed for inclusion in a feature vector, for example, is of no significance.

Turning to the vertical bar-extraction scan of FIG. 3h, two vertical bars 60v were yielded. The northeast (45 degree) scan resulted in the single bar 60ne shown in FIG. 3i while the southeast scan resulted in the two bars 60se shown in FIG. 3j.

As the features of a particular character image 20i are extracted, a profile of the image features is compiled in an assembled feature vector. In various aspects, the feature vector is an array that organizes resolved character-attribute data according to a predetermined set of standards.

Figure 6:
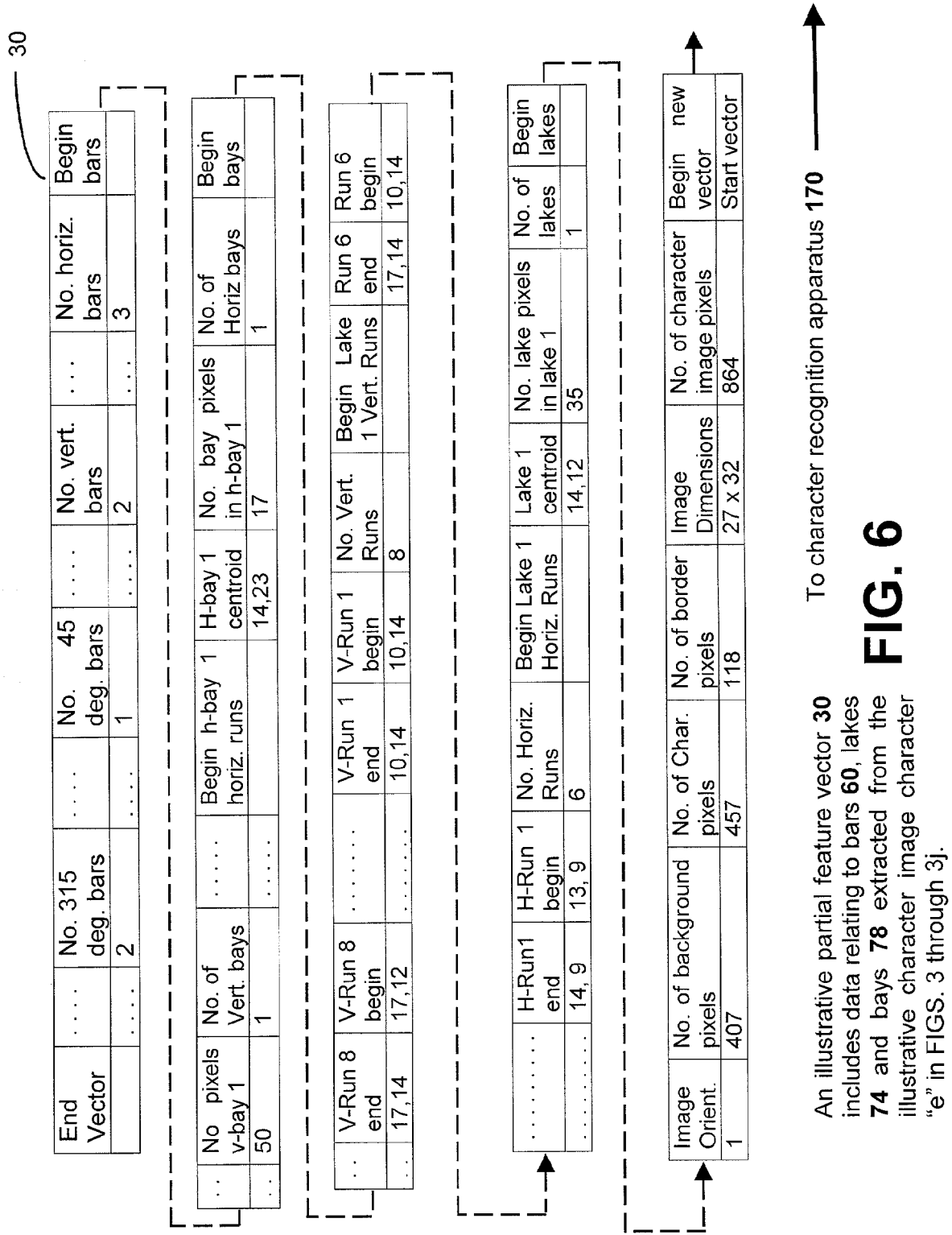
FIG. 6 shows an illustrative feature vector assembled based on the data extracted from the character image character "e" shown in FIGS. 3 through 3j.

Referring to FIG. 6, an illustrative partial assembled feature vector 30 corresponding to the character image character 22 "e" in FIGS. 3 through 3j is shown. The feature vector 30 of FIG. 6 includes data relating to the bars 60, lakes 74 and bays 78 for which extraction is illustrated in FIGS. 3b through 3j. The feature vector 30 of FIG. 6 being illustrative only, it is to be understood that feature vectors 30 can be variously configured and include various data. For instance, a simpler feature vector 30 than that shown in FIG. 6 might include only the quantities of each of bars 60, lakes 74 and bays 78 yielded from each direction of algorithmic scan of a character image character 22 and, perhaps, the spatial relationships among them. Information as to the spatial relationships among extracted character features is at least advantageous in determining the identity of a character image character 22. In some instances spatial relationships become more critical to character identity as, for example, in the illustrative case of "p," "q," "b" and "d," previously discussed, while in other instances a character image character 22 is uniquely identifiable on the basis of character feature quantities alone.

Once a feature vector 30 is assembled, it is rendered accessible to the character recognition apparatus 170, which is programmed to resolve the feature vector 30 and identify the character image character 22 with which the assembled feature vector 30 is associated. As previously discussed, in one alternative implementation, the character recognition apparatus 170 comprises a character dictionary 180 and a comparator unit 200 as shown in FIG. 1. The comparator unit 200 is adapted to receive assembled feature vectors 30 from one or more feature extraction units 150. Once the feature vector 30 corresponding to a particular character image 20i has been assembled, either fully or to the extent possible, the feature vector 30 is rendered accessible to the comparator unit 200. The comparator unit 200 compares the assembled feature vector 30 to standardized character profiles contained within the character dictionary 180 containing a plurality of output character candidates. The output character candidate corresponding to the standardized character profile that most closely resembles the assembled image feature vector 30 is selected as the output character.

Figure 5B:
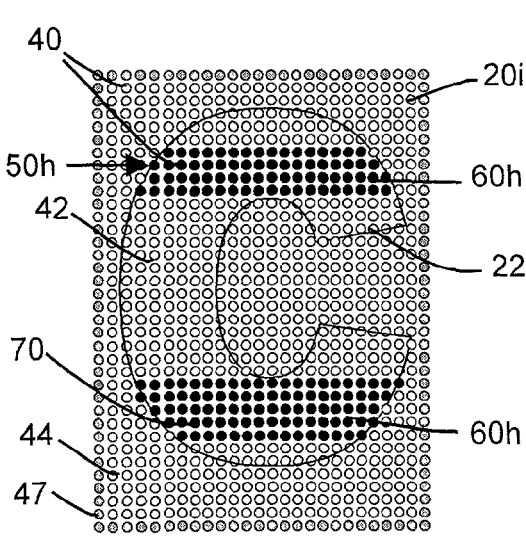
FIG. 5b depicts the results of a horizontal bar-extraction scan performed on the image of FIG. 5.
Figure 5C:
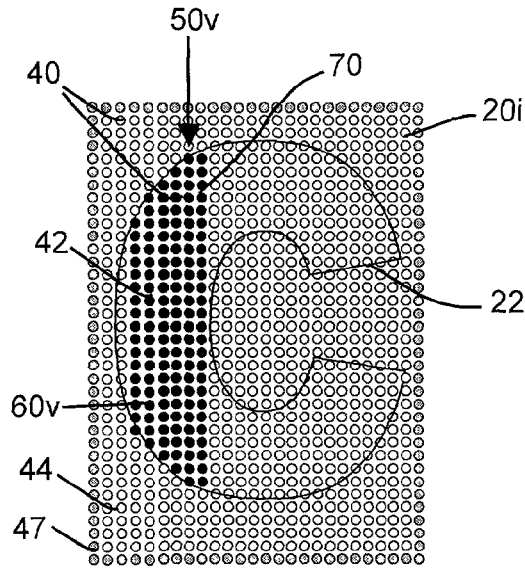
FIG. 5c depicts the results of a vertical bar-extraction scan performed on the image of FIG. 5.
Figure 5D:
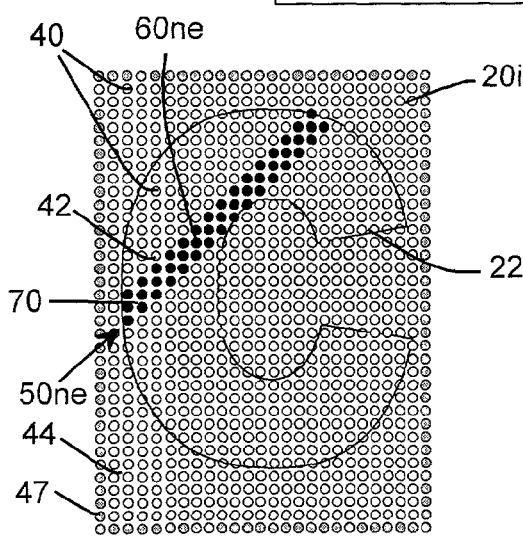
FIG. 5d depicts the results of a 45-degree (northeast) bar-extraction scan performed on the image of FIG. 5.
Figure 5E:
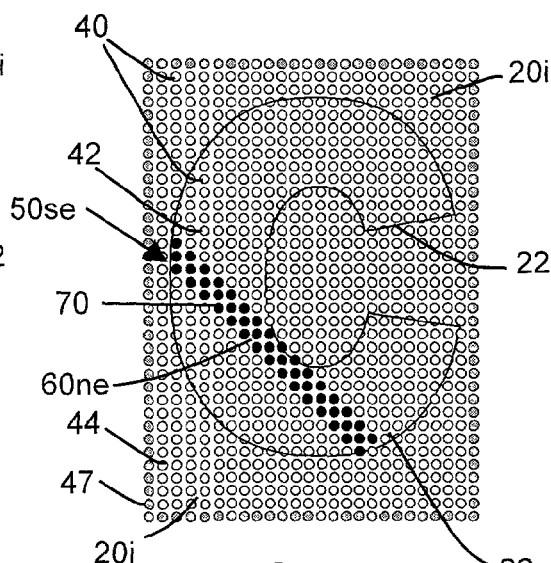
FIG. 5e depicts the results of a 315-degree (southeast) bar-extraction scan performed on the image of FIG. 5.

For purposes of comparing an illustrative assembled feature vector 30 to a standardized character profile in a character dictionary 180, considered the character image 20i of "c" in FIG. 5 as it is algorithmically scanned in FIGS. 5a through 5g to extract only the quantities of bars 60, lakes 74 and bays 78 ascertainable from each direction indicated. FIG. 5a shows the complement of the character image 20i in FIG. 5. Bar-extraction scans for each of four directions are shown in FIGS. 5b through 5e. For purposes of bar extraction, the assumed average stroke width $SW_A$ is 7-pixels and the extraction threshold indicates that a run 50 must be at least $2 \times SW_A + 1$ in length in order to be extracted. A horizontal bar-extraction scan is shown in FIG. 5b as yielding two horizontal bars 60h. The vertical scan of FIG. 5c resulted in a single extracted bar 60v. In FIG. 5d, a 45-degree (i.e., northeast) bar-extraction scan yielded a single northeast bar 60ne. The southeast bar-extraction scan of FIG. 5e indicates a single southeast bar 60se.

Turning to bay and lake extraction, the complemented image 20i of FIG. 5a indicates no connected region 70 that does not touch the edge 45; there is only a single connected region 70 that touches the edge 45. Therefore, no lakes are present in the character image 20i. As previously discussed, FIG. 5f illustrates the results of a horizontal bay extraction scan including the exclusion of all horizontal runs 50 that touch the edge 45. As shown, the horizontal bay-extraction scan yielded two separate horizontal bays 78h. In contrast, the vertical bay-extraction scan results shown in FIG. 5g indicate that there is only a single vertical bay 78v.

Figure 5H:
FIG. 5h shows an illustrative assembled feature vector assembled based on the extraction scan results depicted in FIGS. 5a through 5g.

Referring to FIG. 5h, an illustrative assembled feature vector 30 incorporating the bar, lake and bay data extracted from the character image 20i in FIGS. 5 through 5g is shown. The illustrative assembled feature vector 30 includes categorized data indicating that extracted from the input character image 20i were two horizontal bars, one vertical bar, one southeast (315 degree) bar, one northeast (45 degree) bar, zero lakes, two vertical bays and one horizontal bay.

Referring to FIG. 7, a portion of an illustrative character dictionary 180 includes a plurality of output character candidates 182 and, in association with each output character candidate 182, a standard profile 185 including a set of categorized, standardized character features 188 indicative of the identity of the associated output character candidate

182. Referring to the assembled feature vector 30 of FIG. 5*h* and the partial character dictionary 180 of FIG. 7, the output character candidate 182 having a standardized profile 185 including data most closely resembling the data of the assembled feature vector 30 of FIG. 5*h* is the output character candidate "C." Accordingly, "C" would be selected as the recognized output character.

An additional observation worthy of note in connection with the partial character dictionary 180 of FIG. 7 is that some characters may not be distinguishable solely on the basis of bar, bay and lake quantities. Consider the two sets of characters including "L" and "T" and "M" and "W." Based solely on the partial standard profiles 185 presented in FIG. 7, "L" is indistinguishable from "T" and "M" is indistinguishable from "W." These cases present two illustrative examples of the need for further information in both the character dictionary 180 and the assembled feature vectors corresponding to "L," "T," "M" and "W." Such further information could include, for instance, scan line numbers, run locations within an x-y coordinate system, run locations within numbered scan lines, bounding-box coordinates and bay centroid addresses, by way of nonlimiting example. The more detail included in a feature vector, the more likely the positive identification of the object character to which it corresponds.

Figure 8:
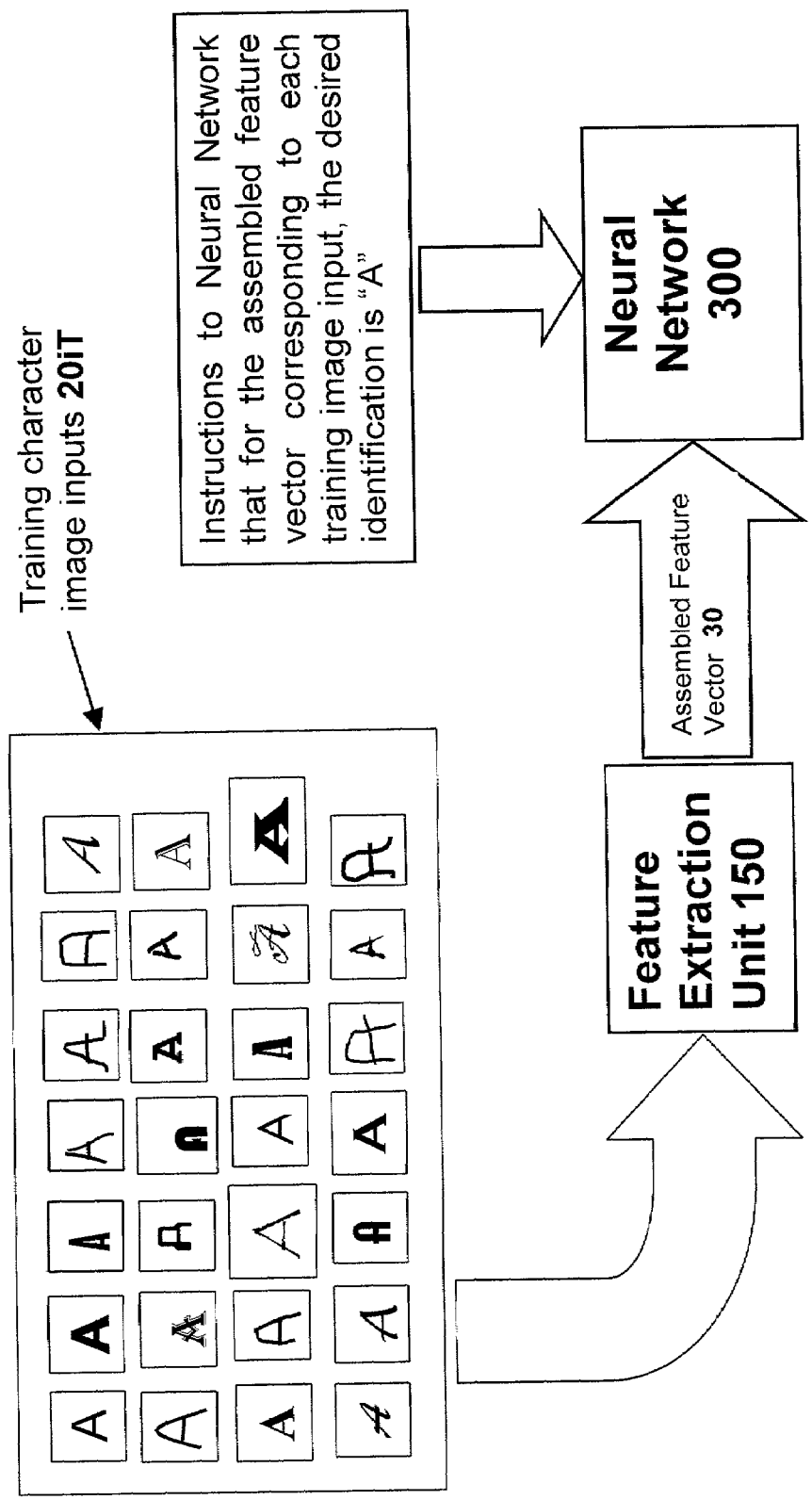
FIG. 8 depicts a neural network being trained to recognize illustrative variations of the character "A.

As previously discussed, the character recognition apparatus 170 in various alternative implementations includes a trainable neural network 300. FIG. 8 depicts an illustrative training session in which a neural network 300 is being trained to recognize numerous variations of the character "A." As shown, the neural network 300 is fed training character image inputs 20*i*T. For each training character image input 20*i*T, a feature vector 30 is assembled and rendered accessible to the neural network 300. For each feature vector 30 communicated to the neural network 300, the neural network 300 is instructed as to the desired identification of the object character (not shown) corresponding to the training character image input 20*i*T from which the feature vector 30 was derived. Through such repetitive exposure to multiple variations of a character, the neural network 300 "learns by example."

Figure 9:
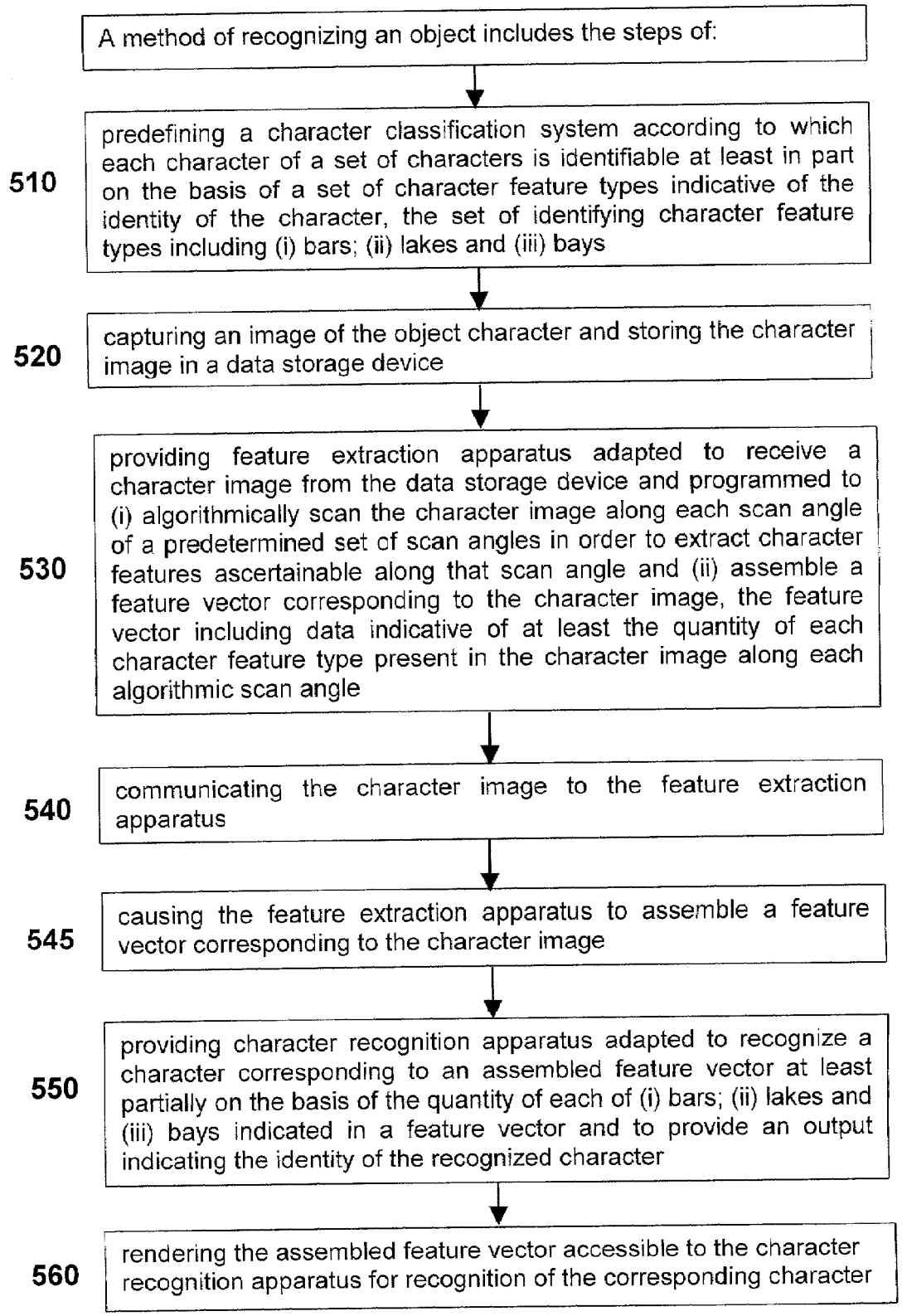
" and FIG. 9 is a flowchart representation of an illustrative character recognition method.

FIG. 9 is a flowchart representation of an illustrative character recognition method relying on the extraction of bars 60, lakes 74 and bays 78 from a character image 20*i*.

Referring to step 510, a classification system is predefined according to which each alphanumeric character of a set of alphanumeric characters is identifiable at least in part on the basis of the presence and/or absence within the character of each character feature type of a predetermined set of character feature types. Among the predetermined set of character feature types are bars, lakes and bays.

In accordance with step 520, an image of an object character is captured and stored as a character image in a data storage device. Feature extraction apparatus is/are provided at step 530. The feature extraction apparatus is/are communicatively linked to the data storage device and adapted to (i) algorithmically scan the character image along each scan angle of a predetermined set of scan angles in order to extract character features ascertainable along that scan angle and (ii) assemble a feature vector corresponding to the character image, the feature vector including data indicative of at least the quantity of each character feature type present in the character image along each scan angle.

Step 540 and 545 call for communicating the character image to the feature extraction apparatus and causing the feature extraction apparatus to assemble a feature vector corresponding to the character image.

At step 550, character recognition apparatus is/are provided. The character recognition apparatus is/are adapted to recognize a character corresponding to an assembled feature vector at least partially on the basis of the quantity of each of (i) bars; (ii) lakes and (iii) bays indicated in the feature vector and to provide an output indicative of the recognized character.

At step 560, the feature vector assembled by the feature extraction apparatus is rendered accessible to the character recognition apparatus for identification (i.e., recognition) of the corresponding object character.

The foregoing is considered to be illustrative of the principles of the invention. For instance, the use throughout this specification of English-alphabet letters as representative characters should not be interpreted as a limitation on the scope of application to English-alphabet and Arabic number characters; the principals of the invention are equally applicable to characters and symbols of any language and may, in fact, find applications beyond character recognition. Furthermore, since modifications and changes to various aspects and implementations will occur to those skilled in the art without departing from the scope and spirit of the invention, it is to be understood that the foregoing does not limit the invention as expressed in the appended claims to the exact construction, implementations and versions shown and described.

What is claimed is:

1. A method of recognizing an object character comprising:
   capturing an image of the object character and storing the character image in a data storage device;
   predefining a classification system in which each object character of a set of object characters is identifiable at least partially on the basis of a set of character feature types within a character image of the object character, the set of character feature types including (i) bars; (ii) lakes and (iii) bays;
   providing feature extraction apparatus communicatively linked to the data storage device and programmed to (i) algorithmically scan a character image along each scan angle of a predetermined set of scan angles in order to extract character features ascertainable along that scan angle and (ii) assemble a feature vector corresponding to the character image, the feature vector including data indicative of at least the quantity of each character feature type present in the character image along each scan angle;
   communicating the character image to the feature extraction apparatus and causing the feature extraction apparatus to assemble a feature vector corresponding to the character image;
   providing character recognition apparatus configured to recognize a character corresponding to an assembled feature vector at least partially on the basis of the quantity of each of (i) bars; (ii) lakes and (iii) bays indicated in the feature vector and to provide an output indicating the identity of the object character; and
   rendering the assembled feature vector accessible to the character recognition apparatus for recognition of the corresponding character,
   wherein the character image comprises character image pixels including character pixels and contrasting background pixels and the feature extraction apparatus is programmed to:
   (i) scan the character image along a plurality of parallel scan lines oriented at each scan angle of the predetermined set of scan angles, wherein each scan line of a selected set of scan lines oriented in accordance with each scan angle passes through each of (a) a character pixel-run including at least one character pixel and (b) at least one background pixel;

(ii) generate pixel-run representations of the character image from each angle of a predetermined set of algorithmic scan angles;

(iii) distinguish background pixels from character pixels within an overall character image including an image boundary;

(iv) identify and extract specified types of connected regions of (a) character pixels and (b) background pixels, the specified types of connected regions of character pixels including bars, each of which bars comprises two or more laterally adjacent character pixel-runs of at least one character pixel each, the connected regions of background pixels including lakes and bays, wherein a lake comprises laterally adjacent runs of background pixels within a connected region of background pixels that does not touch the image boundary and a bay comprises a non-boundary-touching subset of background pixel-runs within a connected region of background pixels that does touch the image boundary; and (v) generate direction-specific data concerning the extraction of bars, lakes and bays uniquely ascertainable from each of the predetermined algorithmic scan angles.

2. The method of claim 1 wherein the character recognition apparatus comprises a character dictionary and a comparator unit, the character dictionary containing a plurality of output character candidates, each output character candidate of the plurality of output character candidates having a corresponding standard profile defined in terms of a combination of standardized character features including at least one of (i) a bar, (ii) a lake and (iii) a bay and wherein the comparator unit is configured to compare an assembled feature vector with standard profiles within the dictionary and identify as the recognized character the output character candidate corresponding to the standard profile that most closely resembles the assembled feature vector.

3. The method of claim 1 wherein the character recognition apparatus comprises a trainable neural network and the method further includes training the neural network to recognize variously configured versions of a particular character by communicating to the neural network a plurality of variously configured character images representative of a particular character and instructing the neural network as to the desired output character to be associated with the variously configured character images.

4. The method of claim 1 wherein the feature extraction apparatus is further configured to extract, and include in a feature vector, data relating to the spatial relationships a character feature has with other character features in the character image.

5. A character recognition system comprising:
a data storage device;
image acquisition apparatus configured to capture an image of an object character and store the character image in the data storage device;
feature extraction apparatus communicatively linked to the data storage device and configured to receive the character image and (i) algorithmically scan the character image along each scan angle of a predetermined set of scan angles in order to extract character features including bars, lakes and bays ascertainable along that scan angle and (ii) assemble a feature vector corresponding to the character image, the feature vector including data indicative of the character feature types present in the character image along each scan angle; and character recognition apparatus configured to receive an assembled character feature vector from the feature extraction unit and recognize a character corresponding to the assembled feature vector at least partially on the basis of the quantity of each of (i) bars; (ii) lakes and (iii) bays indicated in the feature vector, wherein the character image comprises character image pixels including character pixels and contrasting background pixels and the feature extraction apparatus is programmed to:

(i) scan the character image along a plurality of parallel scan lines oriented at each scan angle of the predetermined set of scan angles, wherein each scan line of a selected set of scan lines oriented in accordance with each scan angle passes through each of (a) a character pixel-run including at least one character pixel and (b) at least one background pixel;

(ii) generate pixel-run representations of the character image from each angle of a predetermined set of algorithmic scan angles;

(iii) distinguish background pixels from character pixels within an overall character image including an image boundary;

(iv) identify and extract specified types of connected regions of (a) character pixels and (b) background pixels, the specified types of connected regions of character pixels including bars, each of which bars comprises two or more laterally adjacent character pixel-runs of at least one character pixel each, the connected regions of background pixels including lakes and bays, wherein a lake comprises laterally adjacent runs of background pixels within a connected region of background pixels that does not touch the image boundary and a bay comprises a non-boundary-touching subset of background pixel-runs within a connected region of background pixels that does touch the image boundary; and (v) generate direction-specific data concerning the extraction of bars, lakes and bays uniquely ascertainable from each of the predetermined algorithmic scan angles.

6. The character recognition system of claim 5 wherein the character recognition apparatus comprises a trainable neural network and the method further includes training the neural network to recognize variously configured versions of a particular character by communicating to the neural network a plurality of variously configured character images representative of the particular character and instructing the neural network as to the desired output character to be associated with the variously configured character images.

7. The character recognition system of claim 5 wherein the character recognition apparatus comprises a character dictionary and a comparator unit, the character dictionary containing a plurality of output character candidates, each output character candidate of the plurality of output character candidates having a corresponding standard profile defined in terms of a combination of standardized character features including at least one of (i) a bar, (ii) a lake and (iii) a bay and wherein the comparator unit is configured to compare an assembled feature vector with standard profiles within the dictionary and identify as the recognized character the output character candidate corresponding to the standard profile that most closely resembles the assembled feature vector.

8. A method of recognizing an unknown object character comprising:
  capturing an image of the object character and storing the character image in a data storage device, the character image comprising character pixels within a field of contrasting background pixels, with the field of background pixels being bounded by an image edge comprised of edge pixels;
  providing an image-scanning algorithm configured to:
    (i) scan the character image along a plurality of parallel scan lines oriented each scan angle of the predetermined set of scan angles, wherein each scan line of a selected set of scan lines oriented in accordance with each scan angle passes through each of (a) a character pixel-run including at least one character pixel and (b) at least one background pixel;
    (ii) generate pixel-run representations of the character image from each angle of a predetermined set of algorithmic scan angles;
    (iii) distinguish background pixels from character pixels within an overall character image including an image boundary;
    (iv) identify and extract specified types of connected regions of (a) character pixels and (b) background pixels, the specified types of connected regions of character pixels including bars, each of which bars comprises two or more laterally adjacent character pixel-runs of at least one character pixel each, the connected regions of background pixels including lakes and bays, wherein a lake comprises laterally adjacent runs of background pixels within a connected region of background pixels that does not touch the image boundary and a bay comprises a non-boundary-touching subset of background pixel-runs within a connected region of background pixels that does touch the image boundary; and
    (v) generate direction-specific data concerning the extraction of bars, lakes and bays uniquely ascertainable from each of the predetermined algorithmic scan angles;
  rendering the character image accessible to the image-scanning algorithm and executing the algorithm to generate direction-specific extraction data;
  assembling a character feature vector based on the direction-specific extraction data; and
  communicating the assembled feature vector to character recognition apparatus configured to recognize a character corresponding to an assembled feature vector at least partially on the basis of data relating to bars, lakes and bays indicated in the feature vector.

9. The character recognition system of claim 8 wherein the character recognition apparatus comprises a trainable neural network and the method further includes training the neural network to recognize variously configured versions of a particular character by communicating to the neural network a plurality of variously configured character images representative of the particular character and instructing the neural network as to the desired output character to be associated with the variously configured character images.

10. The method of claim 8 wherein the data that the image-scanning algorithm is configured to generate with respect to a character image includes at least one of:
  (i) the spatial relationships among bars, lakes and bays;
  (ii) the quantity of each of bars, lakes and bays;
  (iii) the pixel count of each bar, lake and bay;
  (iv) the number of direction-specific pixel runs in each bar, lake and bay; and
  (v) the centroid of each bar, lake and bay.

11. The method of claim 8 wherein the feature vector comprises data structures assembled in accordance with a predetermined protocol.

12. The method of claim 8 wherein the character recognition apparatus comprises a character dictionary and a comparator unit, the character dictionary containing a plurality of output character candidates, each output character candidate of the plurality of output character candidates having a corresponding standard profile defined in terms of a combination of standardized character features including at least one of (i) a bar, (ii) a lake and (iii) a bay and wherein the comparator unit is configured to compare an assembled feature vector with standard profiles within the dictionary and identify as the recognized character the output character candidate corresponding to the standard profile that most closely resembles the assembled feature vector.

* * * * *